United States Patent
Tozaki et al.

(10) Patent No.: US 8,672,792 B2
(45) Date of Patent: Mar. 18, 2014

(54) SPEED INCREASING/DECREASING APPARATUS

(75) Inventors: Yasuyoshi Tozaki, Nagasaki (JP); Takeshi Yoshimi, Nagasaki (JP); Hiroyuki Sonobe, Ritto (JP); Isamu Shiotsu, Ritto (JP); Susumu Matsumoto, Kitakyushu (JP)

(73) Assignees: Mitsubishi Heavy Industries, Ltd., Tokyo (JP); Waseda University, Tokyo (JP)

( * ) Notice: Subject to any disclaimer, the term of this patent is extended or adjusted under 35 U.S.C. 154(b) by 504 days.

(21) Appl. No.: 13/003,724

(22) PCT Filed: Oct. 6, 2009

(86) PCT No.: PCT/JP2009/067409
§ 371 (c)(1),
(2), (4) Date: Jan. 11, 2011

(87) PCT Pub. No.: WO2010/044357
PCT Pub. Date: Apr. 22, 2010

(65) Prior Publication Data
US 2011/0136619 A1 Jun. 9, 2011

(30) Foreign Application Priority Data
Oct. 14, 2008 (JP) .................................. 2008-265333

(51) Int. Cl.
*F16H 13/08* (2006.01)

(52) U.S. Cl.
USPC .......................................... 475/196; 475/183

(58) Field of Classification Search
USPC ................ 476/31, 36, 37; 475/196, 183, 197
See application file for complete search history.

(56) References Cited

U.S. PATENT DOCUMENTS 3,955,661 A * 5/1976 Popper et al. ................. 192/150
6,406,399 B1  6/2002 Ai
2008/0305919 A1 * 12/2008 Rennerfelt ..................... 476/36

FOREIGN PATENT DOCUMENTS

| JP | 53-64881 U | 5/1978 |
| JP | 4-54359 A | 2/1992 |
| JP | 6-94092 A | 4/1994 |
| JP | 10-311385 A | 11/1998 |
| JP | 2002-243011 A | 8/2002 |
| JP | 2003-278866 A | 10/2003 |
| JP | 2003-336705 A | 11/2003 |

OTHER PUBLICATIONS

European Search Report dated Jun. 6, 2012.
Niwa et al., "Speed Reducer Modified from Bearing Using Planetary Mechanism", Proceedings of 2007 Spring Meeting of the Japan Society of Precision Engineering, 2007, pp. 979-980.

* cited by examiner

*Primary Examiner* — William C Joyce
(74) *Attorney, Agent, or Firm* — Birch, Stewart, Kolasch & Birch, LLP

(57) ABSTRACT

A first rotary shaft and a second rotary are rotatable around a rotation axis. The second rotary shaft has a cylindrical supporting part that covers an end section of the first rotary shaft. A case supports the first and second rotary shafts. A first rolling bearing is disposed between the first rotary shaft and the case and rotatably supports the first rotary shaft. A second rolling bearing is disposed between the supporting part and the first rotary shaft and supports the first rotary shaft and the second rotary shaft such that they are rotatable relative to each other. A transmission part of the second rotary shaft transmits to the second rolling bearing a preload force that pushes the second rotary shaft to the first rotary shaft side. A load-receiving part of the case receives the preload force transmitted from the second rolling bearing to the first rolling bearing.

4 Claims, 12 Drawing Sheets

SPEED INCREASING/DECREASING APPARATUS

BACKGROUND OF THE INVENTION

1. Field of the Invention

The present invention relates to a speed increasing/decreasing apparatus.

2. Description of the Related Art

Conventionally, a traction drive is known as a speed increasing/decreasing apparatus that transmits power, as well as changing the rotational speed input from an input shaft and outputting it from an output shaft (for example, refer to PTL 1 and NPL 1).

CITATION LIST

Patent Literature

{PTL 1} Japanese Unexamined Patent Application, Publication No. 2002-243011

Non Patent Literature

{NPL 1} Masahito Niwa, Hiroaki Seki, Yoshitsugu Kamiya, and Masatoshi Hikizu, "yusei kikou wo riyou shita jikuuke tenyougata gensokuki (Speed Reducer Modified from Bearing Using Planetary Mechanism)", Proceedings of 2007 Spring Meeting of The Japan Society of Precision Engineering, 2007, pp. 979-980.

SUMMARY OF INVENTION

Technical Problem

In the case of the above-mentioned traction drive, there is an advantage in that the levels of noise and vibration are low compared with a speed increasing/decreasing apparatus using gears. However, there has been a problem in that it is difficult to realize a wide range of reduction ratios with a single gear.

On the other hand, in the case of the traction drive (speed reducer modified from bearing) described in NPL 1, there is a description about increasing the slip ratio in accordance with an increase in output torque.

That is, with the configuration described in NPL 1, a preload is applied by moving an outer ring of an angular bearing in the shaft direction relative to the case. In such a configuration, since the outer ring is stationary due to frictional force acting upon the case, when the output torque increases, the rotational force acting upon the outer ring exceeds the frictional force, and it is considered that there is a possibility of slippage occurring (slip ratio increasing) between the outer ring and the case.

The present invention has been conceived to solve the problem described above, and an object thereof is to provide a speed increasing/decreasing apparatus that can suppress the generation of vibration, noise, and slippage while achieving a wide reduction ratio.

Solution to Problem

To achieve the object described above, the present invention provides the following solutions.

A speed increasing/decreasing apparatus according to the present invention includes a first rotary shaft that is disposed in such a manner as to be rotatable around a rotation axis; a second rotary shaft that is disposed in such a manner as to be rotatable around the rotation axis and that has a cylindrical supporting part covering an end section of the first rotary shaft; a case that supports the first rotary shaft and the second rotary shaft; a first rolling bearing that is disposed between the first rotary shaft and the case and that supports the first rotary shaft in such a manner as to be rotatable; a second rolling bearing that is disposed between the supporting part and the first rotary shaft and that supports the first rotary shaft and the second rotary shaft in such a manner as to be rotatable relative to each other; a preload unit that is provided on the case and that applies a preload force such that the second rotary shaft is pushed to the first rotary shaft side; a transmission part of the second rotary shaft that transmits the preload force applied to the second rotary shaft to the second rolling bearing; and a load-receiving part of the case that receives the preload force transmitted from the second rolling bearing to the first rolling bearing.

According to the present invention, the preload force applied from the preload unit to the second rotary shaft is transmitted to the second rolling bearing via the transmission part and is then received by the load-receiving part of the case via the second rolling bearing and the first rolling bearing. At this time, since the preload unit and the load-receiving part are both provided on the case, the preload force is reliably applied to the second rolling bearing and the first rolling bearing, and a preload sufficient for torque transmission is applied.

Since the preload force is applied to the second rolling bearing by pushing the second rotary shaft to the first rotary shaft side, a preload can be applied to the second rolling bearing, without relatively moving it between the second rolling bearing and the supporting part and the first rotary shaft, in the direction of the rotation axis. Similarly, to apply the preload force to the first rolling bearing, a preload can be applied to the first rolling bearing, without relatively moving it between the first rolling bearing and the case and the first rotary shaft, in the direction of the rotation axis.

In other words, even when the second rolling bearing is attached to the supporting part and the first rotary shaft, and the first rolling bearing is attached to the case and the first rotary shaft, such that they cannot move relative to each other, a preload sufficient for torque transmission is applied to the first rolling bearing and the second rolling bearing, and slippage at the first rolling bearing and the second rolling bearing is prevented.

In the above-described present invention, it is desirable that the first rolling bearing include a first inner ring that includes a first inner rolling surface having a surface inclined radially outward at least from the first rotary shaft to the second rotary shaft and that is connected to the second rolling bearing so as to be capable of transmitting the preload force, a first outer ring that includes a first outer rolling surface having a surface inclined radially outward at least from the first rotary shaft to the second rotary shaft and that is connected to the load-receiving part so as to be capable of transmitting the preload force, and a plurality of first rolling members disposed between the first inner rolling surface and the first outer rolling surface so as to be capable of rolling, and that the second rolling bearing include a second outer ring that includes a second outer rolling surface having a surface inclined radially inward at least from the first rotary shaft to the second rotary shaft and that is connected to the transmission part so as to be capable of transmitting the preload force, a second inner ring that includes a second inner rolling surface having a surface inclined radially inward at least from the first rotary shaft to the second rotary shaft and that is connected to the first rolling bearing so as to be capable of transmitting the preload force, and a plurality of second rolling members disposed between the second inner rolling surface and the second outer rolling surface so as to be capable of rolling.

According to the present invention, the preload force applied from the preload unit to the second rotary shaft is transmitted to the second outer ring of the second rolling bearing via the transmission part. The preload force transmitted to the second outer ring is transmitted to the second inner ring via the second outer rolling surface, the second rolling member, and the second inner rolling surface, and is then transmitted to the first inner ring of the first rolling.

The preload force transmitted to the first inner ring is transmitted to the first outer ring via the first inner rolling surface, the first rolling member, and a first outer transmitting rolling surface. The preload force transmitted to the first outer ring is received by the load-receiving part of the case.

A reactive force acting in a direction opposite to that of the preload force is transmitted from the load-receiving surface to the first inner ring. Therefore, the first rolling member is pushed between the first inner ring and the first outer ring in a direction such that it is compressed. In other words, the first rolling member is pushed between the first inner rolling surface and the first outer rolling surface and applies the preload.

The reactive force is transmitted from the load-receiving part to the second inner ring via the first rolling bearing. Therefore, the second rolling member is pushed between the second inner ring and the second outer ring in a direction such that it is compressed. In other words, the second rolling member is pushed between the second inner rolling surface and the second outer rolling surface and applies the preload.

In the above-described present invention, it is desirable that a rotational speed ratio i of rotational speed n1 of the first rotary shaft and rotational speed n5 of the second rotary shaft be represented by the following expressions using a raceway diameter F1 of the first inner rolling surface, a raceway diameter E1 of the first outer rolling surface, a raceway diameter F2 of the second inner rolling surface, and a raceway diameter E2 of the second outer rolling surface:

$$i = n1/n5 \text{ and}$$
$$= E2(F1 + F2)/E2F1 - E1F2).$$

According to the present invention, by controlling the difference of the product of the raceway diameter E2 of the second outer rolling surface and the raceway diameter F1 of the first inner rolling surface and the product of the raceway diameter E1 of the first outer rolling surface and the raceway diameter F2 of the second inner rolling surface, the rotational speed ratio i of the rotational speed n1 of the first rotary shaft and the rotational speed n5 of the second rotary shaft can be controlled.

In the above-described present invention, it is desirable that the raceway diameter F1 of the first inner rolling surface and the raceway diameter E1 of the first outer rolling surface be controlled by changing a first contact angle of the first rolling bearing.

In the above-described present invention, it is desirable that the raceway diameter F2 of the second inner rolling surface and the raceway diameter E2 of the second outer rolling surface be controlled by changing a second contact angle of the second rolling bearing.

According to the present invention, the rotational speed ratio i of the rotational speed n1 of the first rotary shaft and the rotational speed n5 of the second rotary shaft can be controlled while using the first rolling bearing and the second rolling bearing having substantially the same form.

In other words, even when the revolution radii of the first rolling member and the second rolling member around the rotation axis around the rotation axis are set substantially equal, the rotational speed ratio i can be controlled by controlling the first contact angle or the second contact angle.

Furthermore, since the revolution radii of the first rolling member and the second rolling member can be set substantially equal, the retaining part can have a substantially cylindrical shape, which is easy to fabricate.

In the above-described present invention, it is desirable that at least one of the first rolling members and the second rolling members be shaped as substantially conical rollers.

According to the present invention, the contact of the first rolling member with the first inner ring and the first outer ring and the contact of the second rolling member with the second inner ring and the second outer ring are point contact. For example, compared with when the contact of the rolling member with the inner ring and the outer ring is line contact, the agitation loss for when the first rolling member and the second rolling member roll decreases.

In the above-described present invention, it is desirable that at least one of the first rolling members and the second rolling members be shaped as substantially conical rollers.

According to the present invention, the contact of the first rolling member with the first inner ring and the first outer ring and the contact of the second rolling member with the second inner ring and the second outer ring are line contact. For example, compared with when the contact of the rolling member against the inner ring and the outer ring is point contact, the transmission area of the rotational torque between the first rotary shaft and the second rotary shaft becomes large.

In the above-described present invention, it is desirable that a third rolling bearing and a fourth rolling bearing that support the second rotary shaft in a rotatable manner be provided adjacent to each other in the rotation axis direction between the second rotary shaft and the case.

According to the present invention, since the moment acting in the oscillating direction of the rotation axis of the second rotary shaft is received by the third rolling bearing and the fourth rolling bearing, the second rotary shaft stably rotates around the rotation axis.

In the above-described present invention, it is desirable that the fourth rolling bearing be a roller bearing having a substantially cylindrical rolling member, the preload unit apply the preload force to the third rolling bearing via a fourth outer ring of the fourth rolling bearing, and the third rolling bearing transmit the preload force to the second rotary shaft.

According to the present invention, by using the fourth rolling bearing as a rolling bearing, the moment acting in the oscillating direction of the rotation axis of the second rotary shaft can be reliably received, and the second rotary shaft stably rotates around the rotation axis.

The preload force is transmitted from the fourth outer ring to the third rolling bearing and from the third rolling bearing to the second rotary shaft. At this time, even when the fourth outer ring moves in the direction of the rotation axis relative to the rolling member of the fourth rolling bearing, the fourth rolling bearing can continue supporting the second rotary shaft in a rotatable manner since the rolling member is a substantially cylindrical roller bearing.

Advantageous Effects of Invention

With to the speed increasing/decreasing apparatus according to the present invention, since a preload force is reliably applied to the first rolling bearing and the second rolling bearing by a preload force applied from the preload unit to the second rotary shaft, there is an advantage in that a wide range of reduction ratios can be realized while the occurrence of slippage is prevented. Furthermore, since the rotational speed is increased and decreased using the first rolling bearing and the second rolling bearing, compared with when gears are used in increasing and decreasing speed, there is an advantage in that a wide range of reduction ratios can be realized while the generation of vibration and noise are suppressed.

DETAILED DESCRIPTION OF THE INVENTION

First Embodiment

A speed increasing/decreasing apparatus according to a first embodiment of the present invention will be described below with reference to FIGS. 1 to 4.

Figure 1:
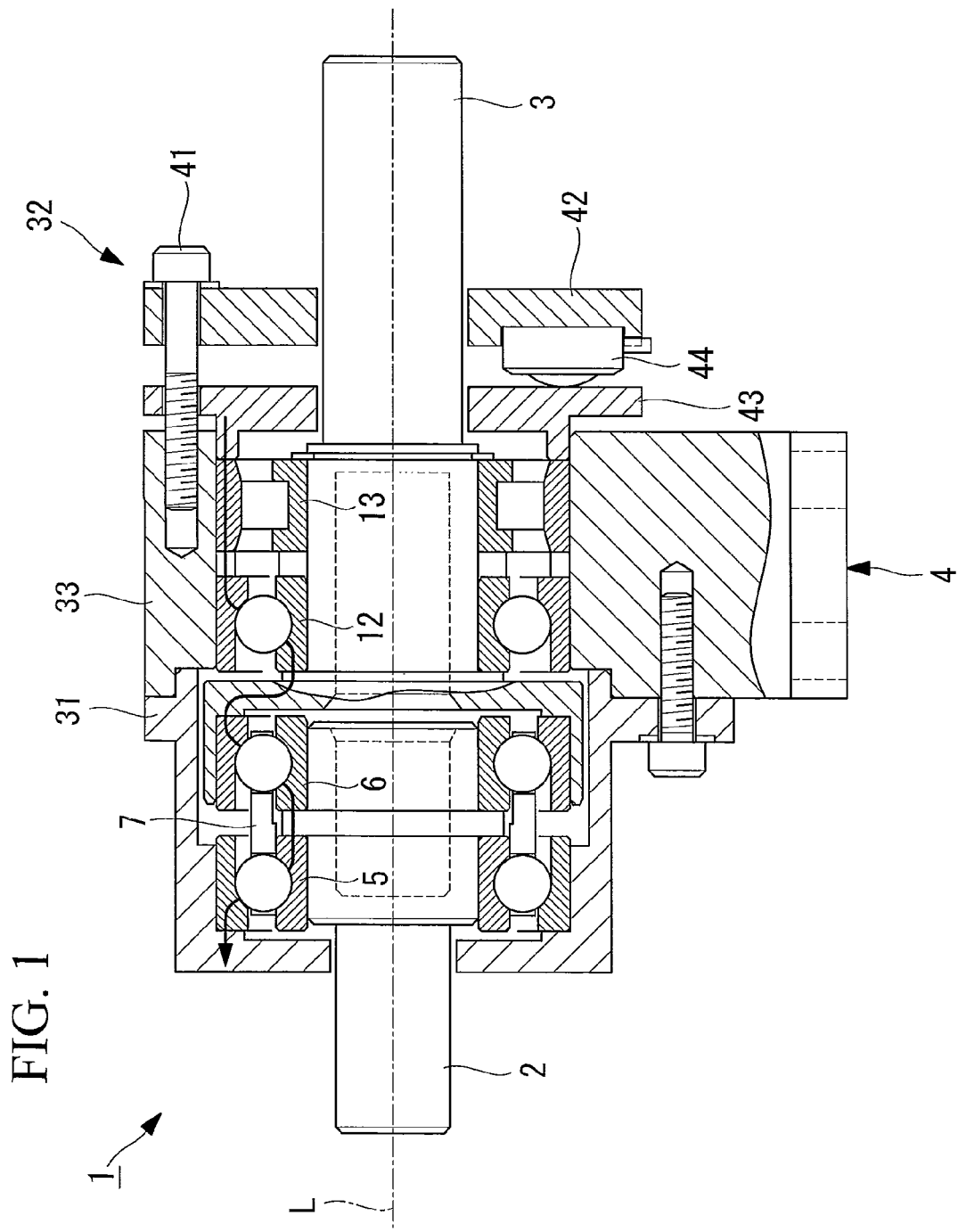
FIG. 1 is a schematic view illustrating the configuration of a speed increasing/decreasing apparatus according to a first embodiment of the present invention.

FIG. 1 is a schematic view illustrating the configuration of a speed increasing/decreasing apparatus according to this embodiment.

In this embodiment, a speed increasing/decreasing apparatus 1 according to the present invention will be described as applied to an example in which the rotational speed of an input rotational driving force is reduced. However, it is not particularly limited thereto, and instead the speed may be increased.

As illustrated in FIG. 1, the speed increasing/decreasing apparatus 1 includes an input shaft (first rotary shaft) 2 that is rotationally driven at a predetermined rotational speed by an external driving source (not shown), an output shaft (second rotary shaft) 3 that is rotated at a rotational speed reduced on the basis of a predetermined rotational speed ratio i, a case 4 that supports the input shaft 2 and the output shaft 3 such that they can rotate around a rotation axis L, an input-side angular ball bearing (first rolling bearing) 5, an output-side angular ball bearing (second rolling bearing) 6, and a retaining part 7.

Here, traction oil may be used as lubricating oil for the speed increasing/decreasing apparatus 1 according to this embodiment. When traction oil is used, a larger force can be transmitted compared with when other lubricating oils are used.

Figure 2:
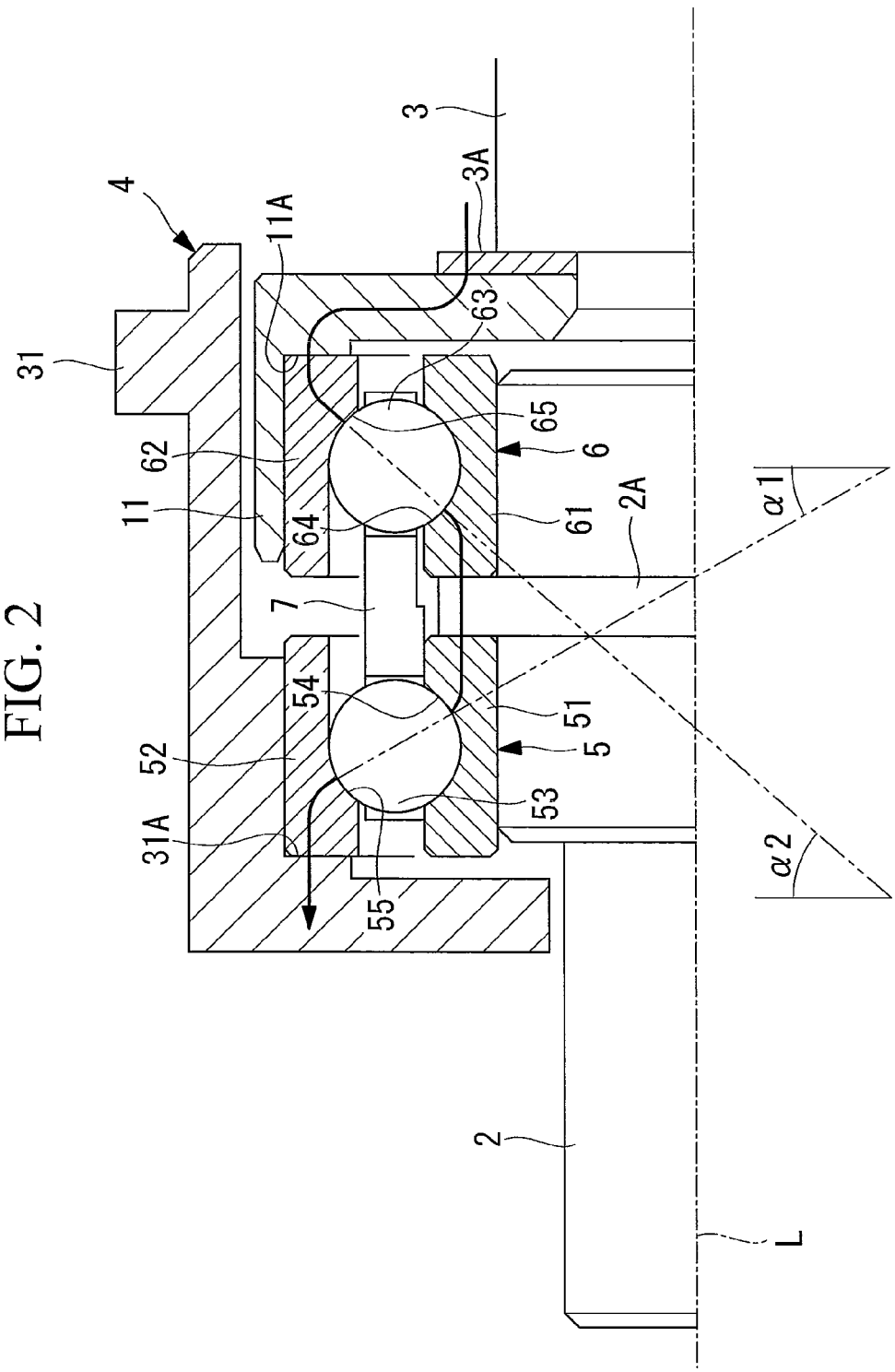
FIG. 2 is a partially enlarged diagram illustrating the configuration around an input shaft in FIG. 1.

FIG. 2 is a partially enlarged diagram illustrating the configuration around the input shaft in FIG. 1.

The input shaft 2 is a substantially cylindrical member rotationally driven by an external driving source and transmits a rotational driving force to the input-side angular ball bearing 5, the output-side angular ball bearing 6, etc.

As illustrated in FIGS. 1 and 2, the input shaft 2 extends along the rotation axis L, and its output shaft 3 side (right side in FIG. 1) is disposed inside the case 4. Furthermore, the end section of the input shaft 2 on the output shaft 3 side is disposed inward of an outer-ring supporting part 11 of the output shaft 3.

The output-side angular ball bearing 6 is provided between the input shaft 2 and the outer-ring supporting part 11, and the input-side angular ball bearing 5 is provided between the input shaft 2 and the case 4. Furthermore, a flange 2A that protrudes radially outward from the circumferential surface of the input shaft 2 and contacts an output-side inner ring 61 of the output-side angular ball bearing 6 and an input-side inner ring 51 of the input-side angular ball bearing 5 is provided on the input shaft 2 between the output-side angular ball bearing 6 and input-side angular ball bearing 5.

In other words, at the end section (right end section in FIG. 1) of the input shaft 2 on the output shaft 3 side, the output-side inner ring 61 of the output-side angular ball bearing 6, the flange 2A, and the input-side inner ring 51 of the input-side angular ball bearing 5 are provided in this order toward the left.

Figure 3:
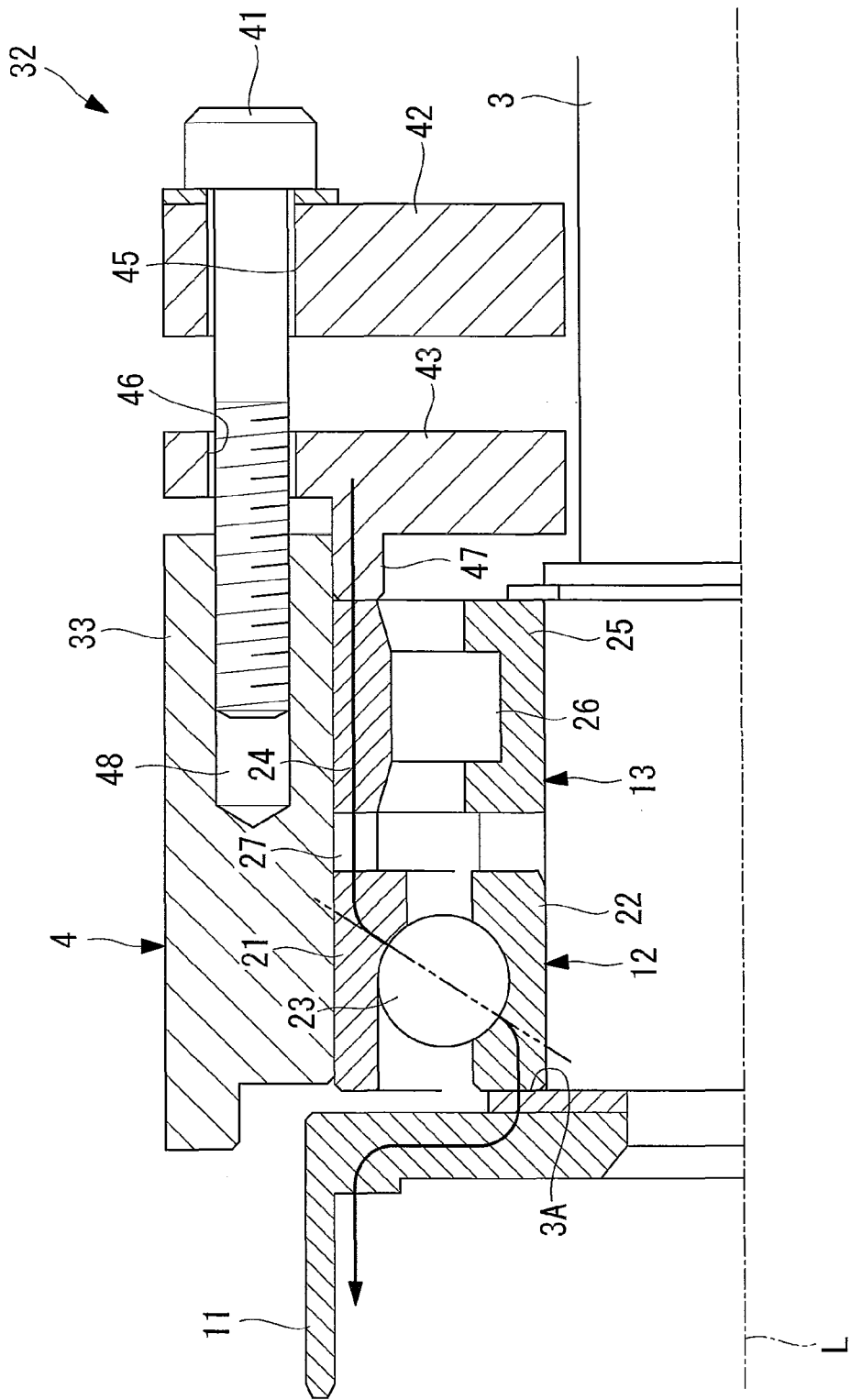
FIG. 3 is a partially enlarged diagram illustrating the configuration around an output shaft in FIG. 1.

FIG. 3 is a partially enlarged diagram illustrating the configuration around the output shaft in FIG. 1.

The output shaft 3 is a substantially cylindrical member that is rotationally driven at a rotational speed reduced by the input-side angular ball bearing 5, the output-side angular ball bearing 6, etc.

As illustrated in FIGS. 1 and 3, the output shaft 3 extends along the rotation axis L, and the input shaft 2 side (left side in FIG. 1) thereof is disposed inside the case 4. Furthermore, at the end section of the output shaft 3 on the input shaft 2 side, the substantially cylindrical outer-ring supporting part (supporting part) 11, whose rotational axis is the rotation axis L, and a transmission surface (transmission part) 11A that transmits a preload to the output-side angular ball bearing 6 at the inner circumferential surface side of the outer-ring supporting part 11 are provided.

The transmission surface 11A is a substantially ring-shaped surface extending orthogonally to the rotation axis L and is a surface contacting an output-side outer ring 62 of the output-side angular ball bearing 6.

As illustrated in FIG. 2, the output-side angular ball bearing 6 is provided between the outer-ring supporting part 11 and the input shaft 2, and, as illustrated in FIG. 3, a first support bearing (third rolling bearing) 12 and a second support bearing (fourth rolling bearing) 13 are provided, in this order from the input shaft 2 side, between the output shaft 3 and the case 4.

In other words, the output-side outer ring 62 is provided on the inner circumferential surface of the outer-ring supporting part 11, and a first support inner ring 22 and a second support inner ring 25 are provided, in this order from the input shaft 2 side, on the circumferential surface of the output shaft 3.

The first support bearing 12 and the second support bearing 13 are aligned at intervals along the rotation axis L and are bearings supporting the output shaft 3 such that it rotates around the rotation axis L.

In this way, the moment acting in the oscillating direction of the rotation axis L of the output shaft 3 is received by the first support bearing 12 and the second support bearing 13, and thus, the output shaft 3 can be stably rotated around the rotation axis L.

A first support outer ring 21, the first support inner ring 22, and a first support rolling member 23 are provided on the first support bearing 12. A second support outer ring (fourth outer ring) 24, the second support inner ring 25, and a second support rolling member 26 are provided on the second support bearing 13.

The first support inner ring 22 is disposed in contact with a protruding part 3A protruding radially outward from the output shaft 3 toward the input shaft 2.

The first support outer ring 21 and the second support outer ring 24 are provided on the case 4 in a movable manner along the direction of the rotation axis L, and a preload ring 27 that transmits a preload that has been applied to the second support outer ring 24 to the first support outer ring 21 is disposed between the first support outer ring 21 and the second support outer ring 24.

In this embodiment, a description will be given as applied to the case where first support bearing 12 is an angular ball bearing, and the second support bearing 13 is a cylindrical roller bearing.

By employing the second support bearing 13 in a cylindrical roller bearing, the moment acting in the oscillating direction of the rotation axis L of the output shaft 3 can be received more reliably, and thus, the output shaft 3 can be stably rotated around the rotation axis L.

Furthermore, the preload is transmitted from the second support outer ring 24 to the first support bearing 12 and is transmitted from the first support bearing 12 to the output shaft 3. At this time, even if the second support outer ring 24 moves in the rotation axis L direction relative to the rolling member of the second support bearing 13, the second support bearing 13 can continue to support the output shaft 3 in a rotatable manner since the rolling member is a substantially cylindrical roller bearing.

As illustrated in FIGS. 1 to 3, the case 4 supports the input shaft 2 and the output shaft 3 such that they can rotate around the rotation axis L.

A cover part 31 accommodating the input-side angular ball bearing 5, the output-side angular ball bearing 6, etc., a preload unit 32 that applies a preload to the input-side angular ball bearing 5 and the output-side angular ball bearing 6, and a case main body 33 to which the cover part 31 and the preload unit 32 are attached are provided on the case 4.

As illustrated in FIGS. 1 and 2, the cover part 31 forms a cylindrical space together with the case main body 33 by being attached on the input shaft 2 side of the case main body 33; and the outer-ring supporting part 11, the input-side angular ball bearing 5, the output-side angular ball bearing 6, etc., are stored in the formed space.

The cover part 31 is a cylindrical member with a bottom surface having an opening on the output shaft 3 side, and a through-hole through which the input shaft 2 penetrates is formed on the end surface on the input shaft 2 side.

The input-side angular ball bearing 5 is provided between the cover part 31 and the input shaft 2, and a gap is provided between the cover part 31 and the outer-ring supporting part 11. In other words, an input-side outer ring 52 is provided on the inner circumferential surface of the cover part 31, and a gap that allows rotation of the outer-ring supporting part 11 is formed by the outer-ring supporting part 11.

A load-receiving surface (load-receiving part) 31A that contacts the input-side outer ring 52 of the input-side angular ball bearing 5 and receives a preload is provided on the cover part 31. The load-receiving surface 31A is a ring-shaped stair-like surface extending radially outward toward the output shaft 3 side.

As illustrated in FIGS. 1 and 3, the preload unit 32 provides a preload by applying a preload to the input-side angular ball bearing 5 and the output-side angular ball bearing 6 via the first support bearing 12, the second support bearing 13, and the output shaft 3.

A preload bolt 41 that generates a preload, a first pushing part 42, a second pushing part 43, and a load cell 44 that measures the preload are provided in the preload unit 32.

The preload bolt 41 pushes the first pushing part 42 and the second pushing part 43 to the input shaft 2 side together with the first support outer ring 21 and the second support outer ring 24 and generates a preload to be applied to the input-side angular ball bearing 5 and the output-side angular ball bearing 6.

The preload bolt 41 is passed through a first through-hole 45 and a second through-hole 46 formed in the first pushing part 42 and the second pushing part 43, respectively, and is screwed into a bolt hole 48 in the case main body 33.

The first pushing part 42 pushes the preload bolt 41 and the second pushing part 43 to the input shaft 2 side together with the first support outer ring 21 and the second support outer ring 24 and generates a preload to be applied to the input-side angular ball bearing 5 and the output-side angular ball bearing 6.

The first pushing part 42 is a plate-like member in which a hole through which the output shaft 3 is passed is formed and is disposed closer to the output shaft 3 side (right side in FIG. 3) than the second pushing part 43.

The first through-hole 45 through which the preload bolt 41 is passed is formed in the first pushing part 42 and the load cell 44 is disposed on the surface facing the second pushing part 43.

The second pushing part 43 pushes the preload bolt 41 and the first pushing part 42 to the input shaft 2 side together with the first support outer ring 21 and the second support outer ring 24 and generates a preload to be applied to the input-side angular ball bearing 5 and the output-side angular ball bearing 6.

The second pushing part 43 is a plate-like member in which a hole through which the output shaft 3 is passed is formed and is disposed between the first pushing part 42 and the case main body 33.

The second through-hole 46 through which the preload bolt 41 is passes is formed in the second pushing part 43, and a cylindrical part 47 that pushes the second support outer ring 24 is formed on the surface facing the case main body 33.

The load cell 44 is disposed between the first pushing part 42 and the second pushing part 43 and measures the preload transmitted to the input-side angular ball bearing 5, etc.

Here, the load cell 44 is not limited in particular, and a known one may be used.

In the above-described embodiment, an example in which the load cell 44 is used to measure the preload is described. However, it is not limited in particular, and a resilient member, such as a coil spring, may be disposed between the preload bolt 41 and the first pushing part 42, and the preload may be measured on the basis of the amount of compression of the coil spring.

The case main body 33 to which the cover part 31 and the preload unit 32 are attached supports the input shaft 2 and the output shaft 3 in such a manner that they can rotate around the rotation axis L.

As illustrated in FIGS. 1 and 3, the bolt hole 48 into which the preload bolt 41 is screwed is formed in the case main body 33. Furthermore, the first support bearing 12 and the second support bearing 13 are provided between the case main body 33 and the output shaft 3, and the preload ring 27 is provided between the first support bearing 12 and the second support bearing 13.

As illustrated in FIGS. 1 and 2, the input-side angular ball bearing 5 is an angular ball bearing provided between the cover part 31 and the input shaft 2 and reduces the rotational speed of the input shaft 2 and transmits it to the output shaft 3 together with the output-side angular ball bearing 6 and the retaining part 7.

The input-side inner ring (first inner ring) 51, the input-side outer ring (first outer ring) 52, and an input-side ball (first rolling member) 53 are provided on the input-side angular ball bearing 5.

The input-side inner ring 51 is a ring-shaped member provided on the circumferential surface of the input shaft 2.

An input-side inner rolling surface (first inner rolling surface) 54 on which the input-side ball 53 rolls is provided on the radially outward side of the input-side inner ring 51. The input-side inner rolling surface 54 is provided with a surface inclined radially outward from the input shaft 2 to the output shaft 3, i.e., a surface that receives the preload.

The input-side outer ring 52 is a ring-shaped member provided on the inner circumferential surface of the cover part 31 and is, for example, press-fitted to the inner circumferential surface of the cover part 31.

An input-side outer rolling surface (first outer rolling surface) 55 on which the input-side ball 53 rolls is provided radially inward of the input-side outer ring 52. The input-side outer rolling surface 55 is provided with a surface inclined radially outward from the input shaft 2 to the output shaft 3, i.e., a surface that receives the preload.

In this embodiment, a description will be given as applied to a case in which the contact angle (first contact angle) $\alpha 1$ of the input-side angular ball bearing 5 is approximately 30°.

Here, the contact angle $\alpha 1$ is the angle formed between a line of action connecting a contact point of the input-side ball 53 and the input-side inner rolling surface 54 and a contact point of the input-side ball 53 and the input-side outer rolling surface 55 and a radial plane.

The input-side angular ball bearing 5 is disposed such that the line of action inclines toward the rotation axis L to the output shaft 3 side.

As illustrated in FIGS. 1 and 2, the output-side angular ball bearing 6 is an angular ball bearing provided between the outer-ring supporting part 11 and the input shaft 2 and reduces the rotational speed of the input shaft 2 and transmits it to the output shaft 3 together with the input-side angular ball bearing 5 and the retaining part 7.

The output-side inner ring (second inner ring) 61, the output-side outer ring (second outer ring) 62, and an output-side ball (second rolling member) 63 are provided on the output-side angular ball bearing 6.

The output-side inner ring 61 is a ring-shaped member provided on the circumferential surface of the input shaft 2, and an output-side inner rolling surface (second inner rolling surface) 64 on which the output-side ball 63 rolls is provided radially outward of the output-side inner ring 61. The output-side inner rolling surface 64 is provided with a surface inclined radially inward from the input shaft 2 to the output shaft 3, i.e., a surface that receives the preload.

The output-side outer ring 62 is a ring-shaped member provided on the inner circumferential surface of the outer-ring supporting part 11 and is, for example, press-fitted to the outer-ring supporting part 11.

An output-side outer rolling surface (second outer rolling surface) 65 on which the output-side ball 63 rolls is provided radially inward of the output-side outer ring 62. The output-side outer rolling surface 65 is provided with a surface inclined radially inward from the input shaft 2 to the output shaft 3, i.e., a surface that receives the preload.

In this embodiment, a description will be given as applied to a case in which the contact angle (second contact angle) $\alpha 2$ of the output-side angular ball bearing 6 is approximately 40°.

Here, the contact angle $\alpha 2$ is the angle formed between a line of action connecting a contact point of the output-side ball 63 and the output-side inner rolling surface 64 and a contact point of the output-side ball 63 and the output-side outer rolling surface 65 and a radial plane.

The output-side angular ball bearing 6 is disposed such that the line of action inclines toward the rotation axis L to the input shaft 2 side.

As illustrated in FIGS. 1 and 2, the retaining part 7 is, for example, a substantially cylindrical member formed of a material such as copper alloy and retains the input-side ball 53 and the output-side ball 63.

By forming the retaining part 7 using copper alloy, the life time of and the amount of torque that can be transmitted by the retaining part 7 increase compared with when other materials are used.

The retaining part 7 is a substantially cylindrical member extending along the rotation axis L and is configured in such a manner that it can rotate around the rotation axis L. A number of notches corresponding to the number of input-side balls 53 are formed to retain the input-side balls 53 at the end section of the retaining part 7 on the input shaft 2 side, and a number of notches corresponding to the number of output-side balls 63 are formed to retain the output-side balls 63 at the end section of the retaining part 7 on the output shaft 3 side.

Furthermore, a resin having lubricity, such as polytetrafluoroethylene (Teflon (trademark)) etc., is disposed on the sliding surfaces of the input-side ball 53 and the output-side ball 63 on the retaining part 7. In this way, the sliding loss between the retaining part 7 and the input-side ball 53 and output-side ball 63 can be reduced.

Next, the operation of the speed increasing/decreasing apparatus 1 having the above-described configuration will be described.

First, a rotation transmission path from the input shaft 2 to the output shaft 3 will be described.

As illustrated in FIGS. 1 and 2, the rotation of the input shaft 2 is transmitted to the input-side ball 53 via the input-side inner ring 51 of the input-side angular ball bearing 5, and the input-side ball 53 revolves around the rotation axis L. The revolution of the input-side ball 53 is transmitted to the output-side ball 63 of the output-side angular ball bearing 6 via the retaining part 7. The revolution of the output-side ball 63 around the rotation axis L causes the rotation to be transmitted to the output-side outer ring 62, and then the rotation is transmitted from the output-side outer ring 62 to the output shaft 3 via the outer-ring supporting part 11.

Next, a method of applying a preload to the input-side angular ball bearing 5 and the output-side angular ball bearing 6 will be described.

When a preload is applied, as illustrated in FIGS. 1 and 3, by rotating the preload bolt 41, a force (hereinafter, referred to as "preload force") acting on the input shaft 2 side acts on the first pushing part 42. The preload force is transmitted from the first pushing part 42 to the second pushing part 43 via the load cell 44, and its magnitude is measured by the load cell 44.

In this way, the magnitude of the preload applied to the input-side angular ball bearing 5 and the output-side angular ball bearing 6 can be determined.

The preload force transmitted to the second pushing part 43 is transmitted from the cylindrical part 47 of the second pushing part 43 to the first support outer ring 21 via the second support outer ring 24 and the preload ring 27. Since the first support outer ring 21, the preload ring 27, and the second support outer ring 24 are disposed along the rotation axis L such that they are movable with respect to the case main body 33, the preload force is transmitted up to the first support outer ring 21. Furthermore, since the second support bearing 13 is a cylindrical roller bearing, the transmission of the preload force is not blocked.

Since the first support bearing 12 is an angular ball bearing, the preload force transmitted to the first support outer ring 21 is transmitted to the first support inner ring 22 along the line of action and is transmitted from the protruding part 3A to the output shaft 3.

As illustrated in FIGS. 1 and 2, the preload force transmitted to the output shaft 3 is transmitted from the transmission surface 11A to the output-side outer ring 62 of the output-side angular ball bearing 6, causing a preload to act on the output-side angular ball bearing 6.

Furthermore, the preload force is transmitted along the line of action of the output-side angular ball bearing 6 to the flange 2A of the input shaft 2 and then transmitted from the flange 2A to the input-side inner ring 51 of the input-side angular ball bearing 5, causing a preload to act on the input-side angular ball bearing 5.

Next, a decrease in the rotational speed of the input-side angular ball bearing 5 and the output-side angular ball bearing 6 will be described.

Figure 4:
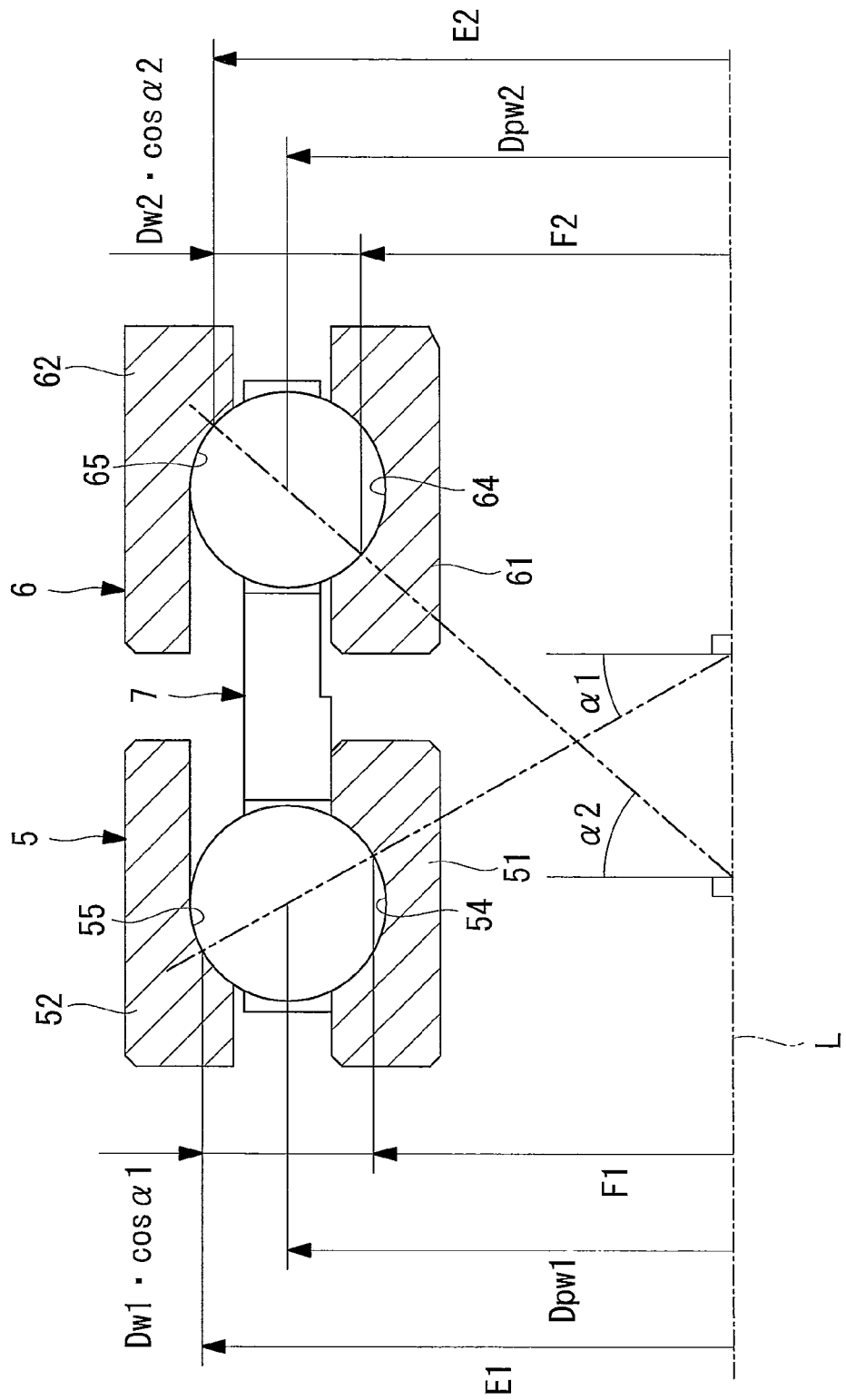
FIG. 4 is a partially enlarged diagram illustrating the configuration of an input-side angular ball bearing and an output-side angular ball bearing of FIG. 1.

FIG. 4 is a partially enlarged diagram illustrating the configuration of the input-side angular ball bearing and the output-side angular ball bearing of FIG. 1.

First, the rotational speed of the input-side ball 53 of the input-side angular ball bearing 5 in the revolving direction is represented by the following Expression 2.

$$n3 = (F1 \cdot n1 + E1 \cdot n2)/(F1+E1) \quad (2)$$

Here, n1 represents the rotational speed of the input-side inner ring 51, n2 represents the rotational speed of the input-side outer ring 52, and n3 represents the rotational speed of the input-side ball 53 in the revolving direction. Moreover, F1 represents the raceway diameter of the input-side inner ring 51, and E1 represents the raceway diameter of the input-side outer ring 52 (refer to FIG. 4).

The raceway diameter F1 is a diameter related to the contact points of the input-side inner rolling surface 54 and the input-side ball 53 and is the diameter of the circle that is the locus of these contact points. Similarly, the raceway diameter E1 is a diameter related to the contact points of the input-side outer rolling surface 55 and the input-side ball 53.

The input-side outer ring 52 is disposed on the cover part 31 and does not rotate; therefore the rotational speed is zero (n2=0), and the above-described Expression 2 is represented by the following Expression 3.

$$n3 = (F1 \cdot n1)/(F1+E1) \quad (3)$$

Moreover, the rotational speed of the output-side ball 63 of the output-side angular ball bearing 6 in the revolving direction is represented by the following Expression 4.

$$n6 = (F2 \cdot n4 + E2 \cdot n5)/(F2+E2) \quad (4)$$

Here, n4 represents the rotational speed of the output-side inner ring 61, n5 represents the rotational speed of the output-side outer ring 62, and n6 represents the rotational speed of the output-side ball 63 in the revolving direction. Moreover, F2 represents the raceway diameter of the output-side inner ring 61, and E2 represents the raceway diameter of the output-side outer ring 62 (refer to FIG. 4).

The raceway diameter F2 is a diameter related to the contact points of the output-side inner rolling surface 64 and the output-side ball 63 and is the diameter of the circle that is the locus of these contact points. Similarly, the raceway diameter E2 is a diameter related to the contact points of the output-side outer rolling surface 65 and the output-side ball 63.

Accordingly, the rotational speed of the output-side outer ring 62 is represented by the following Expression 5.

$$n5 = ((F2+E2)n6 + F2 \cdot n4)/E2 \quad (5)$$

Since the input-side ball 53 and the output-side ball 63 revolve while being retained by the retaining part 7, the rotational speeds of both equal in the revolving direction (n3=n6). Here, by substituting Expression 3 in Expression 5 to eliminate n6, the following Expression 6 is obtained.

$$n5 = ((E2F1 - E1F2)/E2(F1+E1))n1 \quad (6)$$

The rotational speed ratio i, i.e., reduction ratio i, of the input shaft 2 and the output shaft 3 is represented by the following Expression 7 based on the above-described Expression 6.

$$\begin{aligned} i &= n1/n5 \\ &= E2(F1+E1)/(E2F1 - E1F2) \end{aligned} \quad (7)$$

Accordingly, by controlling the raceway diameters F1, E1, F2, and E2, rotational speed ratios i with various values are realized. Typical values of the rotational speed ratio i are, for example, 2.5, 10, 50, and 100.

Furthermore, by controlling the sign of (E2F1−E1F2) in Expression 7, control is performed for rotating the input shaft 2 and the output shaft 3 in the same direction or rotating them in the opposite directions.

Next, a control method for the raceway diameters F1, E1, F2, and E2 will be described. Specifically, the relationship between each of the orbit distances F1 and E1 and the contact angle α1 and the relationship between each orbit distance F2 and E2 and the contact angle α2 will be described.

As illustrated in FIG. 4, each of the orbit distances F1 and E1 and the contact angle α1 have relationships represented by the following Expressions 8 and 9.

$$F1 = Dpw1 + (Dw1 \cdot \cos \alpha 1)/2 \quad (8)$$

$$E1 = Dpw1 - (Dw1 \cdot \cos \alpha 1)/2 \quad (9)$$

Here, Dpw1 represents the pitch circle diameter of the input-side angular ball bearing 5, and Dw1 represents the diameter of the input-side ball 53.

Similarly, each of the orbit distances F2 and E2 and the contact angle α2 have relationships represented by the following Expressions 10 and 11.

$$F2 = Dpw2 + (Dw2 \cdot \cos \alpha 2)/2 \quad (10)$$

$$E2 = Dpw2 - (Dw2 \cdot \cos \alpha 2)/2 \quad (11)$$

Here, Dpw2 represents the pitch circle diameter of the output-side angular ball bearing 6, and Dw2 represents the diameter of the output-side ball 63.

Based on the above-described Expressions 8 to 11, because the pitch circle diameters Dpw1 and Dpw2, the diameter Dw1 of the input-side ball 53, and the diameter Dw2 of the output-side ball 63 do not change, by controlling the contact angle α1 and the contact angle α2, the values of the raceway diameters F1 and E1 and raceway diameters F2 and E2 can be determined.

Accordingly, by controlling the contact angle α1 of the input-side angular ball bearing 5 and the contact angle α2 of the output-side angular ball bearing 6, the rotational speed ratio i is controlled.

According to the above-described configuration, the preload force applied from the preload unit 32 to the output shaft 3 is transmitted to the output-side angular ball bearing 6 via the transmission surface 11A and is then received by the load-receiving surface 31A of the case 4 via the output-side angular ball bearing 6 and the input-side angular ball bearing 5. At this time, since both the preload unit 32 and the load-receiving surface 31A are provided on the case 4, the preload force is reliably applied to the output-side angular ball bearing 6 and the input-side angular ball bearing 5, and a preload sufficient for torque transmission can be applied.

Since the preload force is applied to the output-side angular ball bearing 6 by pushing the output shaft 3 toward the input shaft 2 side, a preload is applied to the output-side angular ball bearing 6, without relatively moving the output-side angular ball bearing 6 against the outer-ring supporting part 11 and the input shaft 2 in a direction along the rotation axis L. Similarly, since the preload force is applied to the input-side angular ball bearing 5, a preload is applied to the input-side angular ball bearing 5, without relatively moving the input-side angular ball bearing 5 against the case 4 and the input shaft 2 in the direction along the rotation axis L.

In other words, even when the output-side angular ball bearing 6 is attached to the outer-ring supporting part 11 and the input shaft 2 and the input-side angular ball bearing 5 is attached to the case 4 and the input shaft 2 by a method that prevents relative movement, respectively, a sufficient preload for torque transmission can be applied to the input-side angular ball bearing 5 and the output-side angular ball bearing 6, and slippage in the input-side angular ball bearing 5 and the second rolling bearing can be prevented.

Specifically, the preload force applied from the preload unit 32 to the output shaft 3 is transmitted to the output-side outer ring 62 of the output-side angular ball bearing 6 via the transmission surface 11A. The preload force transmitted to the output-side outer ring 62 is transmitted to the output-side inner ring 61 via the output-side outer rolling surface 65, the output-side ball 63, and the output-side inner rolling surface 64 and is further transmitted to the input-side inner ring 51 of the input-side angular ball bearing 5.

The preload force transmitted to the input-side inner ring 51 is transmitted to the input-side outer ring 52 via the input-side inner rolling surface 54, the input-side ball 53, and the input-side outer rolling surface 55. The preload force transmitted to the input-side outer ring 52 is received by the load-receiving surface 31A of the case 4.

A reactive force acting in a direction opposite to that of the preload force is transmitted from the load-receiving surface 31A to the input-side inner ring 51. Therefore, the input-side ball 53 is pushed in a direction in which it is compressed between the input-side inner ring 51 and the input-side outer ring 52. In other words, the input-side ball 53 is pushed between the input-side inner rolling surface 54 and the input-side outer rolling surface 55 and receives the preload.

A reactive force from the load-receiving surface 31A is transmitted to the output-side inner ring 61 via the input-side angular ball bearing 5. Therefore, the output-side ball 63 is pushed in a direction in which it is compressed between the output-side inner ring 61 and the output-side outer ring 62. In other words, the output-side ball 63 is pushed between the output-side inner rolling surface 64 and the output-side outer rolling surface 65 and receives the preload.

As represented by Expression 7, by controlling the difference of the product of the raceway diameter E2 of the output-side outer rolling surface 65 and the raceway diameter F1 of the input-side inner rolling surface 54 and the product of the raceway diameter E1 of the input-side outer rolling surface 55 and the raceway diameter F2 of the output-side inner rolling surface 64, the rotational speed ratio i of the rotational speed n1 of the input shaft 2 and the rotational speed n2 of the output shaft 3 can be controlled.

Furthermore, since each of values of the raceway diameters F1, E1, F2, and E2 is controlled by controlling the contact angle α1 of the input-side angular ball bearing 5 or the contact angle α2 of the output-side angular ball bearing 6, the rotational speed ratio i can be controlled using the input-side angular ball bearing 5 or the output-side angular ball bearing 6, having substantially the same form.

In other words, even when the revolution radii of the input-side ball 53 and the output-side ball 63 around the rotation axis L are set substantially equal, the rotational speed ratio i can be controlled by controlling the contact angle α1 and the contact angle α2. Furthermore, since the revolution radii of the input-side ball 53 and the output-side ball 63 can be set substantially equal, the retaining part 7 can be a substantially cylindrical shape, which is easy to fabricate.

By using the input-side angular ball bearing 5, the contact of the input-side ball 53 with the first inner ring and the first outer ring, i.e., the contact of the input-side inner rolling surface 54 and the input-side outer rolling surface 55, becomes point contacts. Similarly, by using the output-side angular ball bearing 6, the contact of the output-side ball 63 with the second inner ring and the second outer ring, i.e., the contact of the output-side inner rolling surface 64 and the output-side outer rolling surface 65, becomes point contacts.

Therefore, compared with when the contact of the rolling member and the rolling surface is line contact, agitation loss for when the input-side ball 53 and the output-side ball 63 roll decreases; therefore, the speed increasing/decreasing apparatus 1 according to this embodiment can be used for increasing/reducing speed in a region in which the rotational speed is high.

Here, an exemplary speed increasing/decreasing apparatus 1 according to the above-described embodiment may have, but is not limited to, the following specifications: the ball diameter Dw1 of the input-side ball 53 and the ball diameter Dw2 of the output-side ball 63, which are rolling members, are approximately 4.5 mm (Dw1=Dw2=4.5 mm); the average value of the raceway diameter F1 of the input-side inner ring 51 and the raceway diameter E1 of the input-side outer ring 52 and the average value of the raceway diameter F2 of the output-side inner ring 61 and the raceway diameter E2 of the output-side outer ring 62 are both approximately 11 mm $((F1+E1)/2=(F2+E2)/2=11$ mm); the contact angle $\alpha 1$ is approximately 30°; and the contact angle $\alpha 2$ is approximately 40°, giving a reduction ratio i of approximately 62.

Here, the above-described embodiment has been described as applied to an example in which the rotational speed ratio i is controlled by controlling the contact angle $\alpha 1$ and the contact angle $\alpha 2$. However, it is not particularly limited thereto, and instead, the rotational speed ratio i may be controlled by selecting the ball diameter Dw1 of the input-side ball 53 and the ball diameter Dw2 of the output-side ball 63, or the rotational speed ratio i may be controlled by selecting the raceway diameter F1 or the raceway diameter F2.

The above-described embodiment has been described as applied to an example in which the input-side angular ball bearing 5 and the output-side angular ball bearing 6 are used. However, it is not particularly limited thereto, and deep-groove ball bearings may be used instead of the angular ball bearings.

Second Embodiment

Next, a second embodiment according to the present invention will be described with reference to FIGS. 5 to 7.

The basic configuration of a speed increasing/decreasing apparatus according to this embodiment is similar to the first embodiment; however, the configuration of bearings associated with increasing and decreasing speed differ from that of the first embodiment. Thus, in this embodiment, only the vicinity of the bearings will be described using FIGS. 5 to 7, and descriptions of the other components etc., will be omitted.

Figure 5:
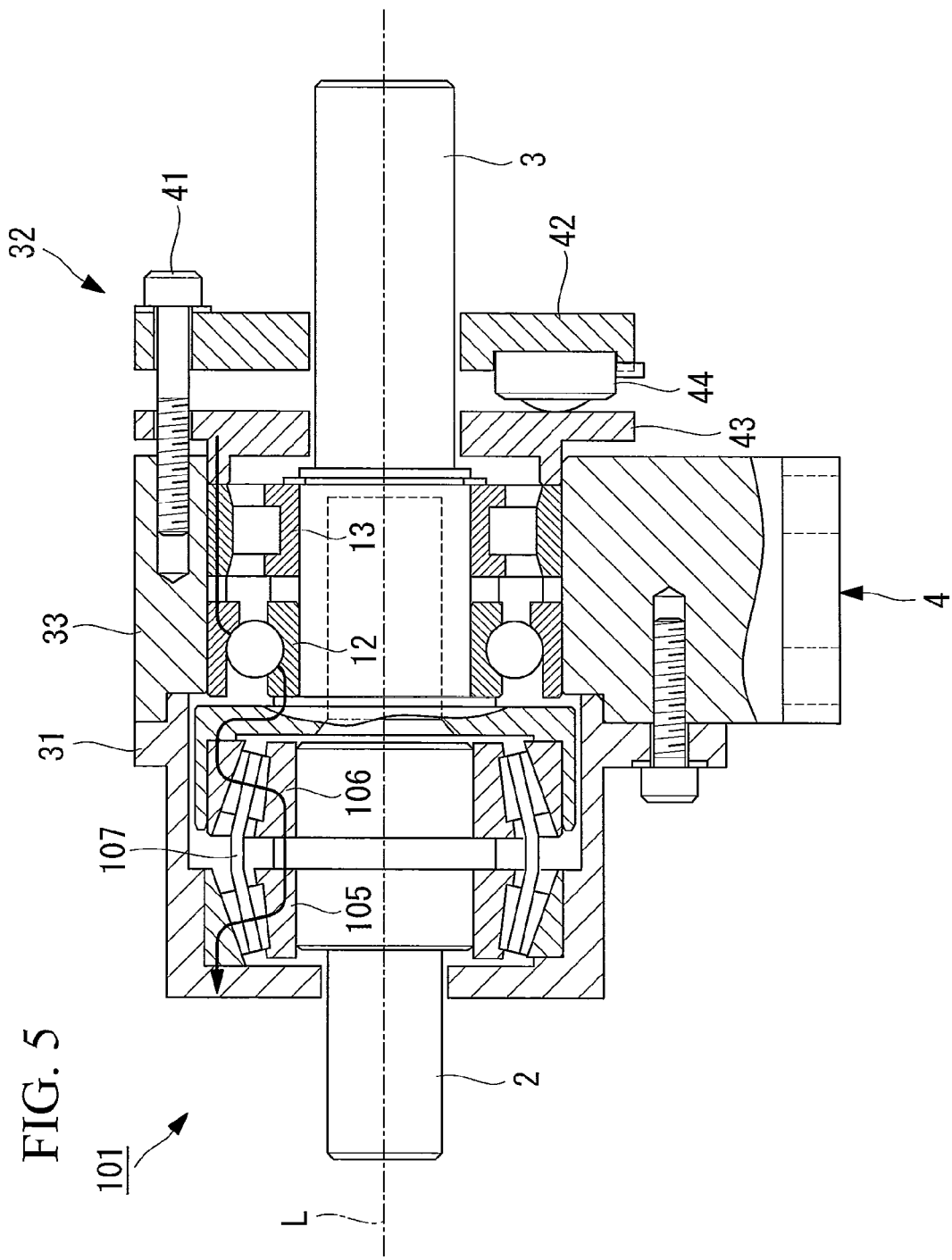
FIG. 5 is a schematic view illustrating the configuration of a speed increasing/decreasing apparatus according to a second embodiment of the present invention.

FIG. 5 is a schematic view illustrating the configuration of the speed increasing/decreasing apparatus according to this embodiment.

Here, the components that are the same as those in the first embodiment will be represented by the same reference numerals, and descriptions thereof will be omitted.

As illustrated in FIG. 5, a speed increasing/decreasing apparatus 101 includes an input shaft 2 that is rotationally driven at a predetermined rotational speed by an external driving source (not shown), an output shaft 3 that is rotated at a rotational speed reduced on the basis of a predetermined rotational speed ratio i, a case 4 that supports the input shaft 2 and the output shaft 3 such that they can rotate around a rotation axis L, an input-side conical roller bearing (first rolling bearing) 105, an output-side conical roller bearing (second rolling bearing) 106, and a retaining part 107.

Figure 6:
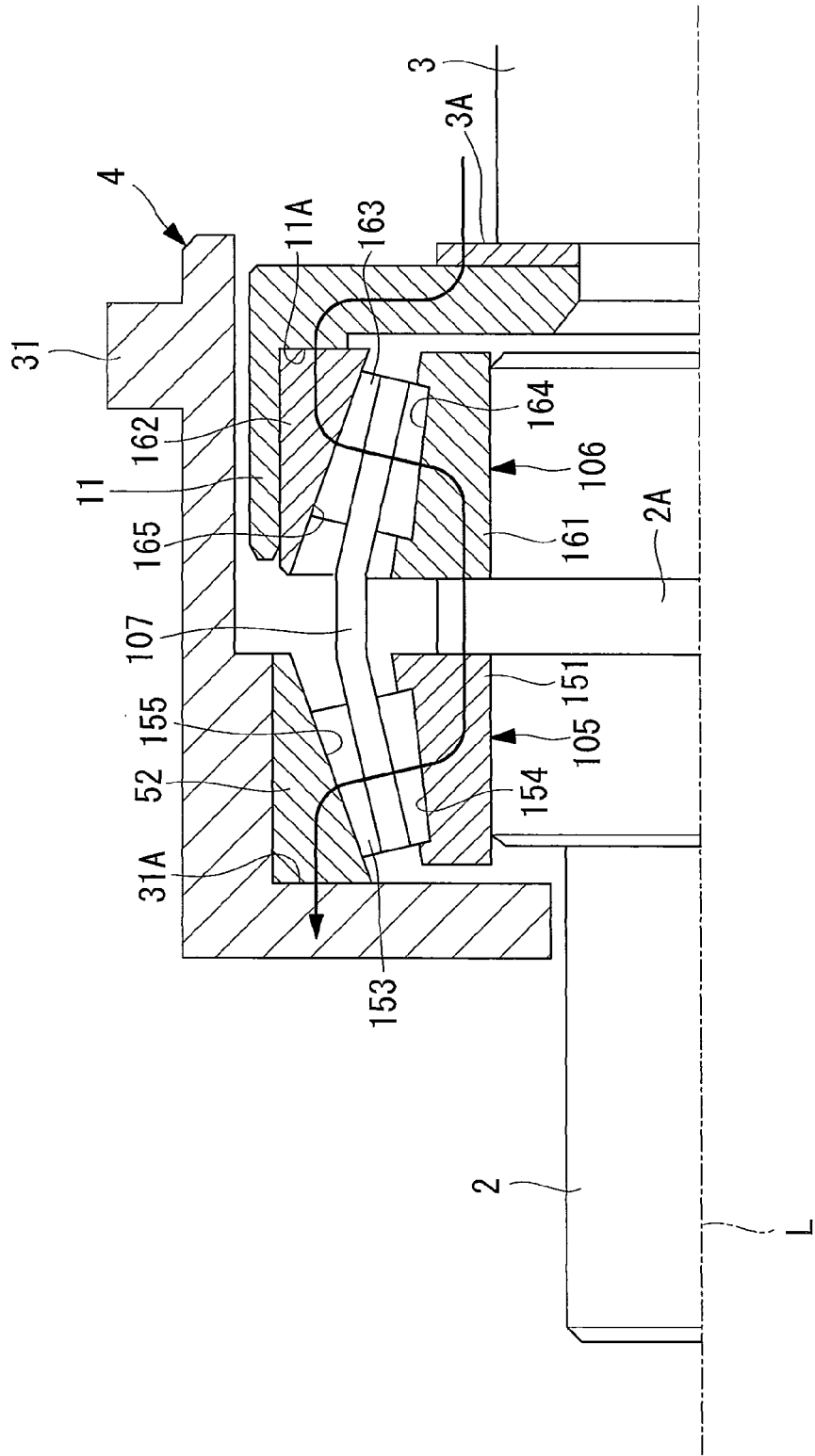
FIG. 6 is a partially enlarged diagram illustrating the configuration of an input-side conical roller bearing and an output-side conical roller bearing in FIG. 5.

FIG. 6 is a partially enlarged diagram illustrating the configuration of the input-side conical roller bearing and output-side conical roller bearing in FIG. 5.

As illustrated in FIGS. 5 and 6, the input-side conical roller bearing 105 is a conical roller bearing provided between a cover part 31 and the input shaft 2 and reduces the rotational speed of the input shaft 2 and transmits it to the output shaft 3 together with the output-side conical roller bearing 106 and the retaining part 107.

An input-side inner ring (first inner ring) 151, an input-side outer ring (first outer ring) 152, and an input-side conical roller (first rolling member) 153 are provided on the input-side conical roller bearing 105.

The input-side inner ring 151 is a ring-shaped member provided on the circumferential surface of the input shaft 2, and an input-side inner rolling surface (first inner rolling surface) 154, which is an inclined surface on which the input-side conical roller 153 rolls is provided on the radially outward side of the input-side inner ring 151.

The input-side outer ring 152 is a ring-shaped member provided on the inner circumferential surface of the cover part 31, and an input-side outer rolling surface (first outer rolling surface) 155, which is an inclined surface on which the input-side conical roller 153 rolls, is provided on the radially inward side of the input-side outer ring 152.

As illustrated in FIGS. 5 and 6, the output-side conical roller bearing 106 is a conical roller bearing provided between an outer-ring supporting part 11 and the input shaft 2 and reduces the rotational speed of the input shaft 2 and transmits it to the output shaft 3 together with the input-side conical roller bearing 105 and the retaining part 107.

An output-side inner ring (second inner ring) 161, an output-side outer ring (second outer ring) 162, and an output-side conical roller (second rolling member) 163 are provided on the output-side conical roller bearing 106.

The output-side inner ring 161 is a ring-shaped member provided on the circumferential surface of the input shaft 2, and an output-side inner rolling surface (second inner rolling surface) 164, which is an inclined surface on which the output-side conical roller 163 rolls, is provided on the radially outward side of the output-side inner ring 161.

The output-side outer ring 162 is a ring-shaped member provided on the inner circumferential surface of the outer-ring supporting part 11, and an output-side outer rolling surface (second outer rolling surface) 165, which is an inclined surface on which the output-side conical roller 163 rolls, is provided on the radially inward side of the output-side outer ring 162.

As illustrated in FIGS. 5 and 6, the retaining part 107 is a substantially cylindrical member and retains the input-side conical roller 153 and the output-side conical roller 163.

The retaining part 107 is a substantially cylindrical member extending along the rotation axis L; the end section on the input shaft 2 side has an inclined surface approaching the rotation axis L in the direction of the input shaft 2 (toward the left in FIG. 6); and the end section on the output shaft 3 side has an inclined surface that approaches the rotation axis in the output shaft 3 direction (toward the right in FIG. 6).

Furthermore, a number of notches corresponding to the number of input-side conical rollers 153 is formed to retain the input-side conical rollers 153 at the end section of the retaining part 107 on the input shaft 2 side, and a number of notches corresponding to the number of output-side conical rollers 163 is formed to retain the output-side conical rollers 163 at the end section of the retaining part 107 on the output shaft 3 side.

The operation of the speed increasing/decreasing apparatus 101 having the above-described configuration will be described.

First, a rotation transmission path from the input shaft 2 to the output shaft 3 will be described.

As illustrated in FIGS. 5 and 6, the rotation of the input shaft 2 is transmitted to the input-side conical roller 153 via the input-side inner ring 151 of the input-side conical roller bearing 105, and the input-side conical roller 153 revolves around the rotation axis L. The revolution of the input-side conical roller 153 is transmitted to the output-side conical roller 163 of the output-side conical roller bearing 106 via the retaining part 107. The revolution of the output-side conical roller 163 around the rotation axis L causes the rotation to be transmitted to the output-side outer ring 162, and then the rotation is transmitted from the output-side outer ring 162 to the output shaft 3 via the outer-ring supporting part 11.

Since the method of applying a preload to the input-side conical roller bearing 105 and the output-side conical roller bearing 106 is similar to that according to the first embodiment, a description thereof will be omitted.

Next, a decrease in the rotational speed of the input-side conical roller bearing 105 and the output-side conical roller bearing 106 will be described.

Figure 7:
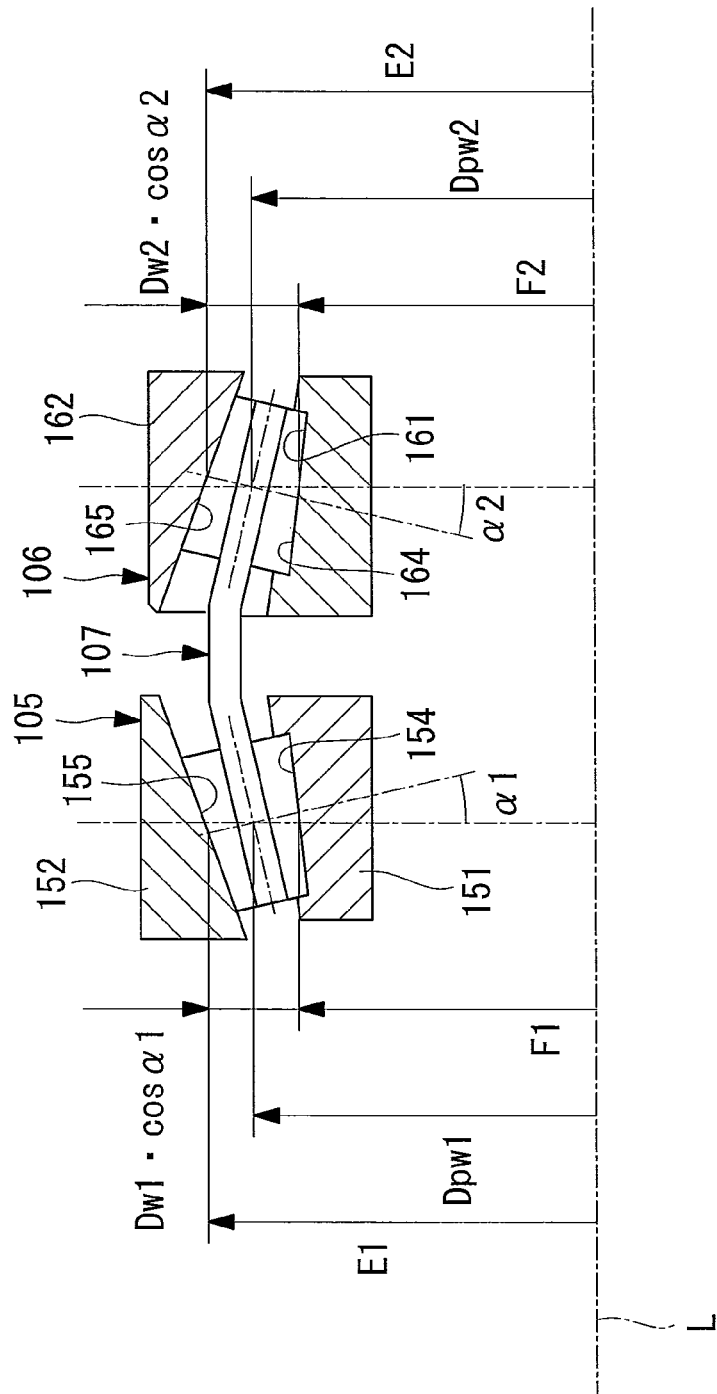
FIG. 7 is a partially enlarged diagram illustrating the configuration of the input-side conical roller bearing and output-side conical roller bearing in FIG. 6.

FIG. 7 is a partially enlarged diagram illustrating the configuration of the input-side conical roller bearing and output-side conical roller bearing in FIG. 6.

Since the expressions defining a decrease in the rotational speed of the input-side conical roller bearing 105 and the output-side conical roller bearing 106 are similar to those used in the description of the first embodiment, here, only the definitions of the values will be discussed.

As illustrated in FIG. 7, a raceway diameter F1 is a diameter related to the contact point of the center area of the input-side conical roller 153 and the input-side inner rolling surface 154 and is the diameter of the circle that is the locus of these contact points. Similarly, a raceway diameter E1 is a diameter related to the contact point of the center area of the input-side conical roller 153 and the input-side outer rolling surface 155.

A raceway diameter F2 is a diameter related to the contact point of the center area of the output-side conical roller 163 and the output-side inner rolling surface 164 and is the diameter of the circle that is the locus of these contact points. Similarly, a raceway diameter E2 is a diameter related to the contact point of the center area of the output-side conical roller 163 and the output-side outer rolling surface 165.

Dpw1 is the pitch circle diameter at the center of the input-side conical roller 153, and Dw1 is the diameter at the center cross-section of the input-side conical roller 153.

Dpw2 is the pitch circle diameter at the center of the output-side conical roller 163, and Dw2 is the diameter at the center cross-section of the output-side conical roller 163.

According to the above-described configuration, the contact of the input-side conical roller 153 with the input-side inner rolling surface 154 and the input-side outer rolling surface 155 and the contact of the output-side conical roller 163 with the output-side inner rolling surface 164 and the output-side outer rolling surface 165 are line contact. Therefore, in the speed increasing/decreasing apparatus 101 according to this embodiment, since the transmission area of rotational torque between the input shaft 2 and the output shaft 3 is large compared with that when the contact of the rolling member and the rolling surface is line contact, a large torque can be transmitted.

Third Embodiment

Next, a third embodiment according to the present invention will be described with reference to FIGS. 8 to 11.

The basic configuration of a speed increasing/decreasing apparatus according to this embodiment is similar to the first embodiment; however, the surrounding configuration of bearings associated with increasing and decreasing speed differs from that of the first embodiment. Thus, in this embodiment, only the surrounding configuration of the bearings associated with the increasing and decreasing speed will be described using FIGS. 8 to 11, and descriptions of the other components etc. will be omitted.

Figure 8:
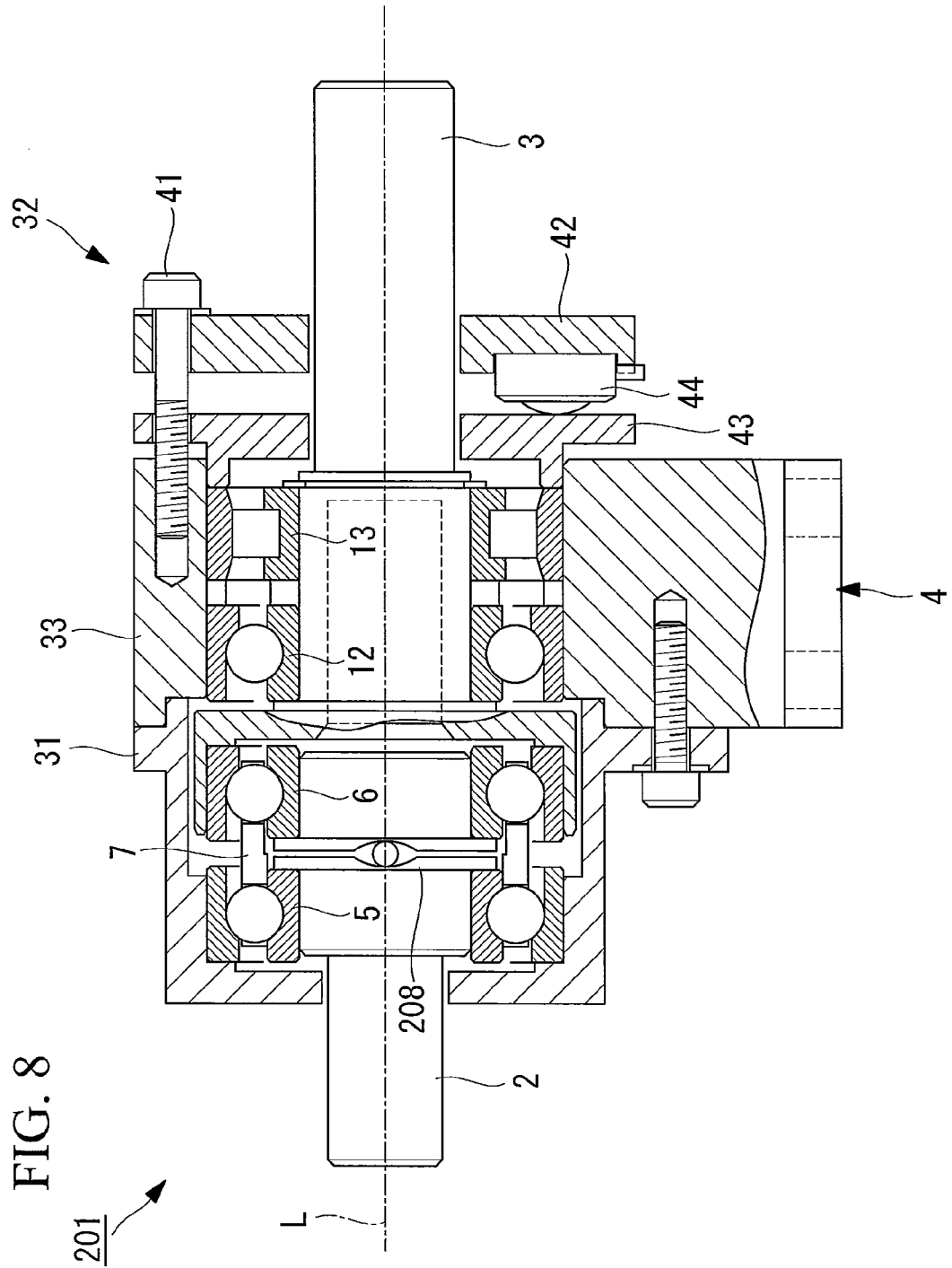
FIG. 8 is a schematic view illustrating the configuration of a speed increasing/decreasing apparatus according to a third embodiment of the present invention.

FIG. 8 is a schematic view illustrating the configuration of the speed increasing/decreasing apparatus according to this embodiment.

Here, the components that are the same as those in the first embodiment will be represented by the same reference numerals, and descriptions thereof will be omitted.

As illustrated in FIG. 8, a speed increasing/decreasing apparatus 201 includes an input shaft 2 that is rotationally driven at a predetermined rotational speed by an external driving source (not shown), an output shaft 3 that is rotated at a rotational speed reduced on the basis of a predetermined rotational speed ratio i, a case 4 that supports the input shaft 2 and the output shaft 3 such that they can rotate around a rotation axis L, an input-side angular ball bearing 5, an output-side angular ball bearing 6, and a retaining part 7 that transmit the rotation from the input shaft 2 to the output shaft 3, and a torque cam 208 that controls the preload to be applied to the input-side angular ball bearing 5 and the output-side angular ball bearing 6.

Figure 9:
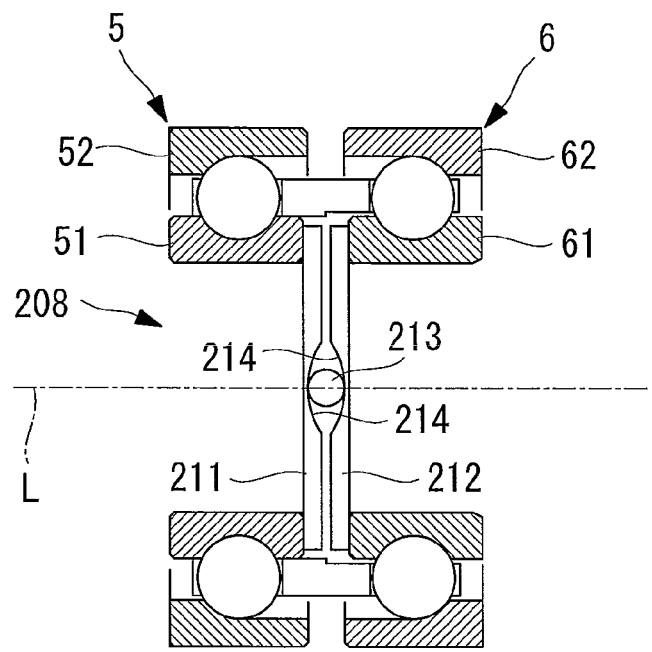
FIG. 9 is a partially enlarged diagram illustrating the configuration of a torque cam in FIG. 8.

FIG. 9 is a partially enlarged diagram illustrating the configuration of the torque cam in FIG. 8.

As illustrated in FIGS. 8 and 9, the torque cam 208 is disposed between the input-side angular ball bearing 5 and the output-side angular ball bearing 6 and controls the preload to be applied to the input-side angular ball bearing 5 and the output-side angular ball bearing 6.

As illustrated in FIG. 9, the torque cam 208 is provided with an input-side cam section 211, an output-side cam section 212, and a guide roller 213.

The input-side cam section 211 is a substantially disc-like member that generates a force that acts in a direction along a rotation axis L, together with the output-side cam section 212 and the guide roller 213. The input-side cam section 211 is disposed in contact with the input-side inner ring 51 of the input-side angular ball bearing 5 with its center axis substantially aligned with the rotation axis L.

A guiding groove 214 that contacts the guide roller 213 is formed in the surface of the input-side cam section 211 facing the output-side cam section 212. An inclined surface that approaches the output-side cam section 212 from the center thereof toward both end sections thereof is formed in the guiding groove 214.

The output-side cam section 212 is a substantially disc-like member that generates, together with the input-side cam section 211 and the guide roller 213, a force that acts in a direction along a rotation axis L. The output-side cam section 212 is disposed in contact with the output-side inner ring 61 of the output-side angular ball bearing 6 with its center axis substantially aligned with the rotation axis L.

A guiding groove 214 that contacts the guide roller 213 is formed in the surface of the input-side cam section 211 facing the output-side cam section 212. An inclined surface that approaches the output-side cam section 212 from the center thereof toward both end sections thereof is formed on in the guiding groove 214.

The guide roller 213 is a roller that generates, together with the input-side cam section 211 and the output-side cam section 212, a force that acts in a direction along the rotation axis L.

The guide roller 213 is disposed between the guiding groove 214 of the input-side cam section 211 and the guiding groove 214 of the output-side cam section 212 and is capable of rolling with respect to the input-side cam section 211 and the output-side cam section 212.

Next, a preload control method using the torque cam will be described.

When torque is not applied to the torque cam 208 around the rotation axis L, as illustrated in FIG. 9, the guide roller 213 moves to the deepest position in the guiding groove 214 since a preload is applied by a preload unit 32.

In other words, the input-side cam section 211 and the output-side cam section 212 are in positions closest to each other.

Figure 10:
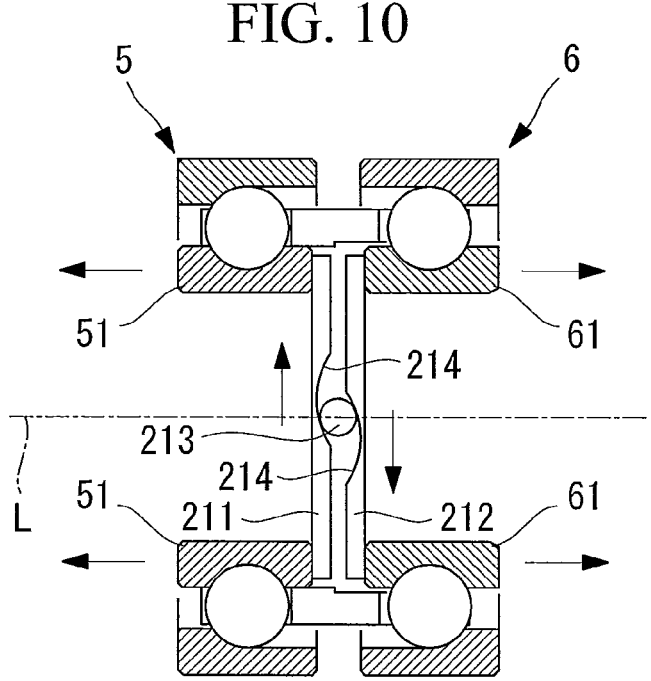
FIG. 10 is a partially enlarged diagram illustrating a state in which a preload from the torque cam in FIG. 9 is increased.

FIG. 10 is a partially enlarged diagram illustrating a state in which the preload from the torque cam in FIG. 9 is increased.

Subsequently, when torque is applied to the torque cam 208 around the rotation axis L, as illustrated in FIG. 10, the phases of the input-side cam section 211 and the output-side cam section 212 will not match. That is, a phase difference is generated between the guiding groove 214 of the input-side cam section 211 and the guiding groove 214 of the output-side cam section 212. The guide roller 213 rolls with respect to the input-side cam section 211 and the output-side cam section 212 and contacts the inclined surfaces of the guiding grooves 214.

The guide roller 213 causes forces to act in directions that separate the input-side cam section 211 and the output-side cam section 212.

In other words, a force toward the input shaft 2 side (left side in FIG. 10) acts on the input-side cam section 211 in a direction along the rotation axis L, and this force is transmitted to the input-side inner ring 51 of the input-side angular ball bearing 5. A force toward the output shaft 3 side (right side in FIG. 10) acts on the output-side cam section 212 in a direction along the rotation axis L, and this force is transmitted to the output-side inner ring 61 of the output-side angular ball bearing 6.

In this way, forces act on the input-side angular ball bearing 5 and the output-side angular ball bearing 6 to cause them to separate, and these forces cause the preload to increase.

The preload applied by the torque cam 208 to the input-side angular ball bearing 5 and the output-side angular ball bearing 6 is substantially proportional to the torque value applied from the torque cam 208.

According to the above-described configuration, the preload applied to the input-side angular ball bearing 5 and the output-side angular ball bearing 6 is automatically controlled in accordance with the magnitude of the value of the torque applied to the speed increasing/decreasing apparatus 201. Therefore, compared with a method of controlling the preload applied to the input-side angular ball bearing 5 and the output-side angular ball bearing 6 by only the preload unit 32, slippage etc., in the input-side angular ball bearing 5 and output-side angular ball bearing 6 can be reliably prevented.

Figure 11:
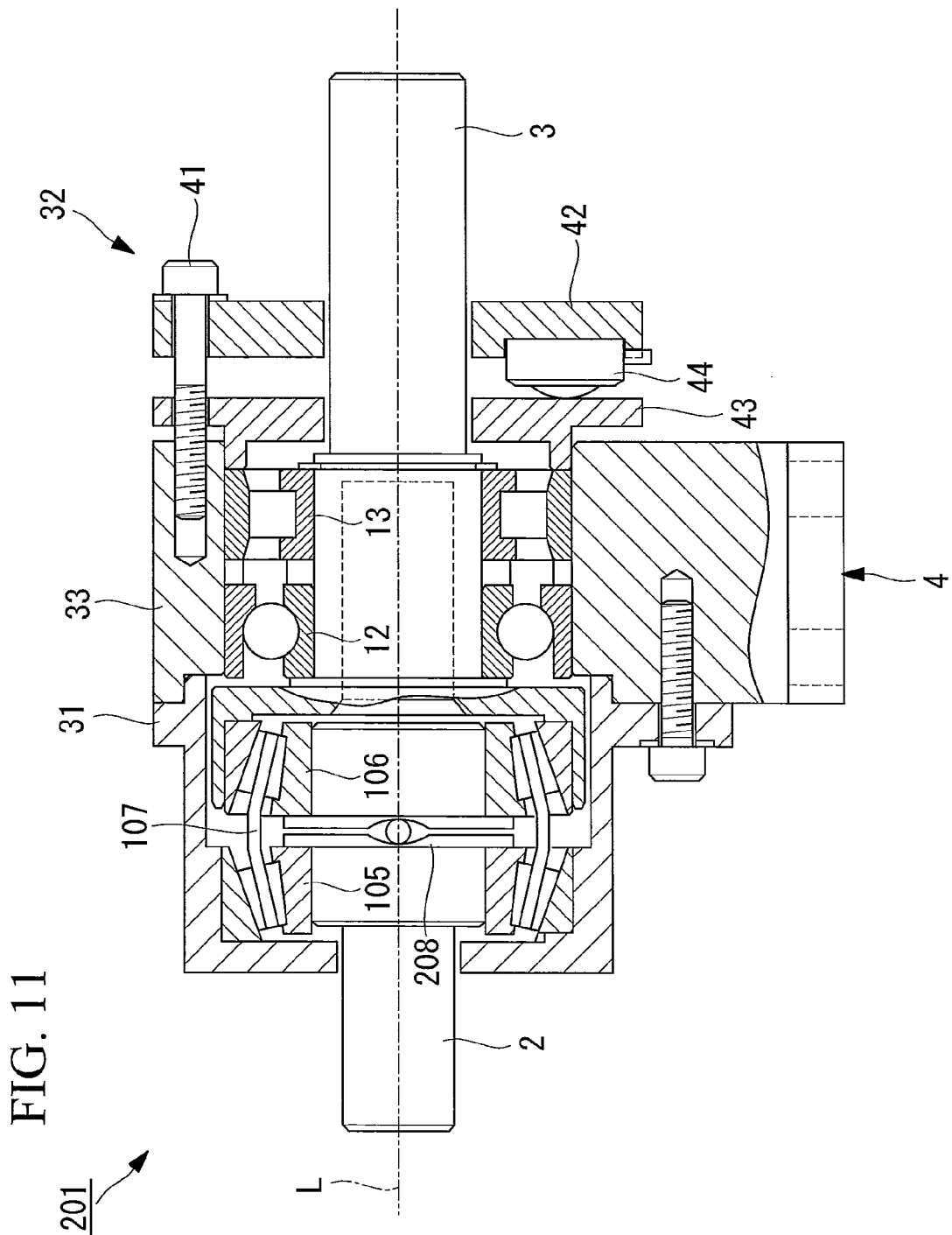
FIG. 11 is a schematic view illustrating another embodiment of the speed increasing/decreasing apparatus in FIG. 8.

FIG. 11 is a schematic view illustrating another embodiment of the speed increasing/decreasing apparatus in FIG. 8.

In the above-described embodiment, an example in which the torque cam 208 has been applied to the speed increasing/decreasing apparatus 201 including the input-side angular ball bearing 5 and the output-side angular ball bearing 6 has been described. However, it is not particularly limited thereto, and as illustrated in FIG. 11, the torque cam 208 may be applied to a speed increasing/decreasing apparatus 201 including an input-side conical roller bearing 105 and an output-side conical roller bearing 106.

Fourth Embodiment

Next, a fourth embodiment of the present invention will be described with reference to FIGS. 12 and 13.

The basic configuration of a speed increasing/decreasing apparatus according to this embodiment is similar to the first embodiment; however, the employment of a combined planetary type configuration differs from that of the first embodiment. Thus, in this embodiment, only will be described using FIGS. 12 to 13, and descriptions of the other components etc., will be omitted.

Figure 12:
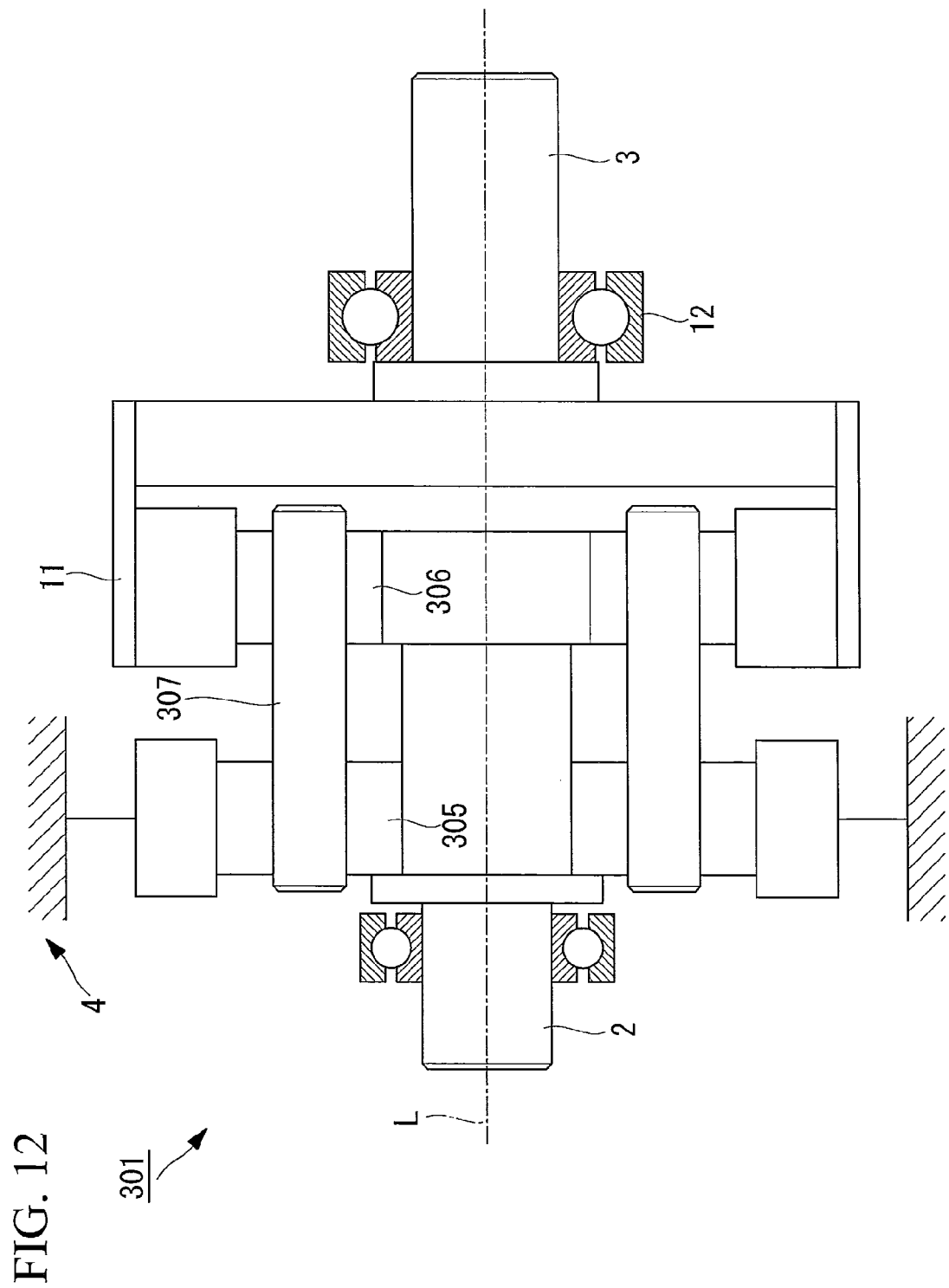
FIG. 12 is a schematic view illustrating the configuration of a speed increasing/decreasing apparatus according to a fourth embodiment of the present invention.

FIG. 12 is a schematic view illustrating the configuration of the speed increasing/decreasing apparatus according to this embodiment.

Here, the components that are the same as those in the first embodiment will be represented by the same reference numerals, and descriptions thereof will be omitted.

As illustrated in FIG. 12, a speed increasing/decreasing apparatus 301 includes an input shaft 2 that is rotationally driven at a predetermined rotational speed by an external driving source (not shown), an output shaft 3 that is rotated at a rotational speed reduced on the basis of a predetermined rotational speed ratio i, a case 4 that supports the input shaft 2 and the output shaft 3 such that they can rotate around a rotation axis L, and an input-side planetary roller part 305, an output-side planetary roller part 306, and a planetary pin 307 that transmit rotation from the input shaft 2 to the output shaft 3.

Figure 13:
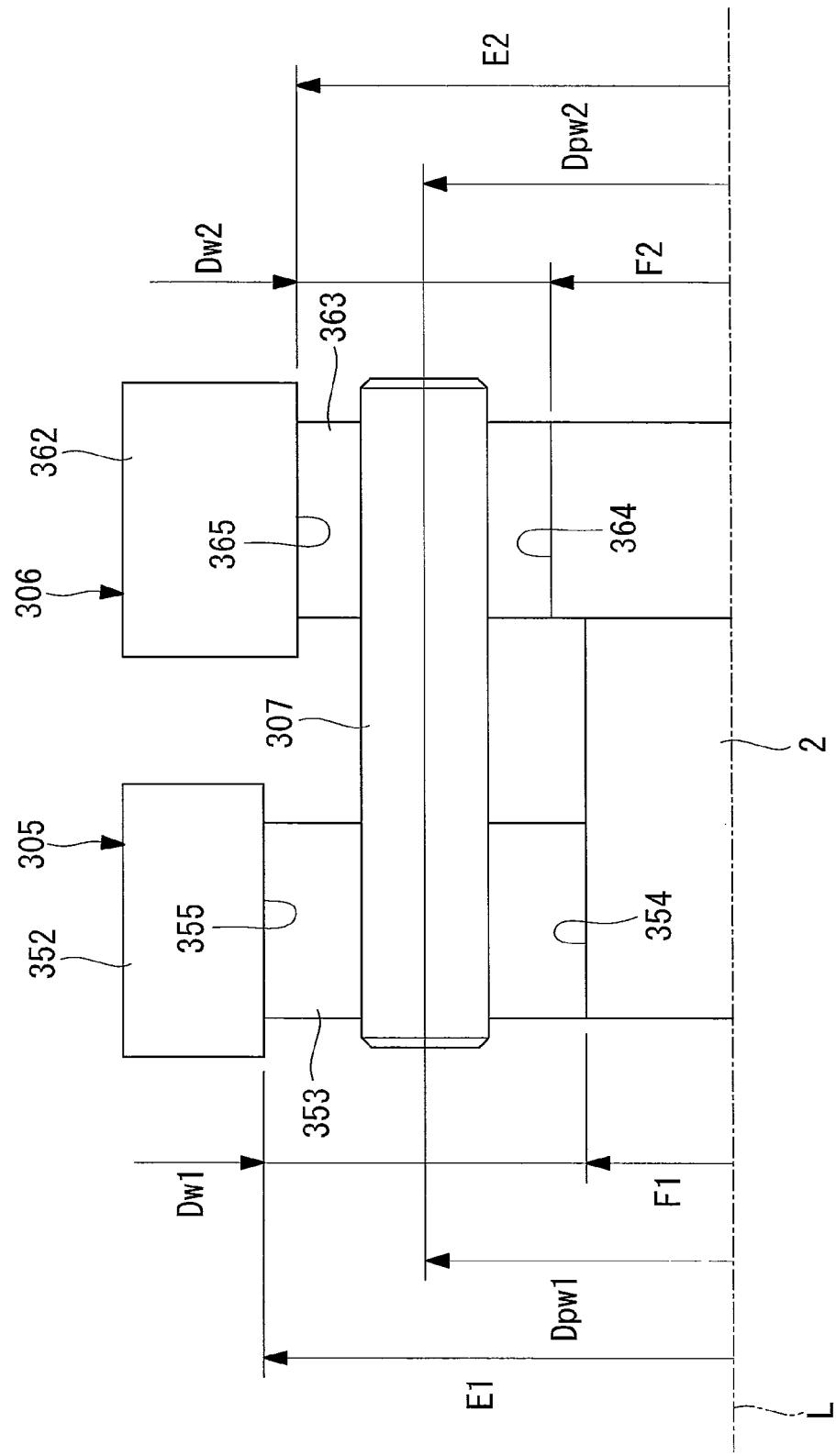
FIG. 13 is a partially enlarged diagram illustrating the configuration of an input-side planetary roller part and an output-side planetary roller part in FIG. 12.

FIG. 13 is a partially enlarged diagram illustrating the configuration of the input-side planetary roller part and the output-side planetary roller part in FIG. 12.

As illustrated in FIGS. 12 and 13, the input-side planetary roller part 305 is a planetary roller provided between the case 4 and the input shaft 2 and reduces the rotational speed of the input shaft 2 and transmits it to the output shaft 3 together with the output-side planetary roller part 306 and the planetary pin 307.

The input-side planetary roller part 305 has an input-side inner rolling surface (first inner rolling surface) 354 provided on the circumferential surface of the input shaft 2, an input-side outer ring 352 on which an input-side outer rolling surface (first outer rolling surface) 355 is formed, and an input-side planetary roller (first rolling member) 353.

The input-side inner rolling surface 354 is a surface provided on the circumferential surface of the input shaft 2 and is a surface on which the input-side planetary roller 353 rolls. The input-side outer rolling surface 355 is a surface provided on the inner circumferential surface of the input-side outer ring 352 and is a surface on which the input-side planetary roller 353 rolls. The input-side outer ring 352 is disposed on the case 4.

The input-side planetary roller 353 is a substantially cylindrical member that is transported between the input-side inner rolling surface 354 and the input-side outer rolling surface 355 and is connected to an output-side planetary roller 363 via the planetary pin 307.

As illustrated in FIGS. 12 and 13, the output-side planetary roller part 306 is a planetary roller provided between the outer-ring supporting part 11 and the input shaft 2 and reduces the rotational speed of the input shaft 2 and transmits it to the output shaft 3 together with the input-side planetary roller part 305 and the planetary pin 307.

The output-side planetary roller part 306 has an output-side inner rolling surface (second inner rolling surface) 364 provided on the circumferential surface of the input shaft 2, an output-side outer ring 362 on which an output-side outer rolling surface (second outer rolling surface) 365 is formed, and an output-side planetary roller (second rolling member) 363.

The output-side inner rolling surface 364 is a surface provided on the circumferential surface of the input shaft 2 and is a surface on which the output-side planetary roller 363 rolls. The output-side outer rolling surface 365 is a surface provided on the inner circumferential surface of the output-side outer ring 362 and is a surface on which the output-side planetary roller 363 rolls. The output-side outer ring 362 is disposed on the outer-ring supporting part 11.

The output-side planetary roller 363 is a substantially cylindrical member that is transported between the output-side inner rolling surface 364 and the output-side outer rolling surface 365 and is connected to the input-side planetary roller 353 via the planetary pin 307.

As illustrated in FIGS. 12 and 13, the planetary pin 307 is a substantially cylindrical member and retains the input-side planetary roller 353 and the output-side planetary roller 363.

The planetary pin 307 extends along a rotation axis L; the input-side planetary roller 353 is disposed at the end section on the input shaft 2 side; and the output-side planetary roller 363 is disposed at the end section on the output shaft 3 side. The input-side planetary roller 353 and the output-side planetary roller 363, together with the planetary pin 307, are disposed in such a manner that they can revolve around the rotation axis L.

The operation of the speed increasing/decreasing apparatus 301 having the above-described configuration will be described.

First, a rotation transmission path from the input shaft 2 to the output shaft 3 will be described.

As illustrated in FIGS. 12 and 13, the rotation of the input shaft 2 is transmitted to the input-side planetary roller 353 via the input-side inner rolling surface 354 of the input-side planetary roller part 305, and the input-side planetary roller 353 revolves around the rotation axis L. The revolution of the input-side planetary roller 353 is transmitted to the output-side planetary roller 363 of the output-side planetary roller part 306 via the planetary pin 307. The revolution of the output-side planetary roller 363 around the rotation axis L causes the rotation to be transmitted to the output-side outer ring 362, and then the rotation is transmitted from the output-side outer ring 362 to the output shaft 3 via the outer-ring supporting part 11.

Next, a decrease in the rotational speed of the input-side planetary roller part 305 and the output-side planetary roller part 306 will be described.

Since the expressions defining a decrease in the rotational speed of the input-side planetary roller part 305 and the output-side planetary roller part 306 are similar to those used in the description of the first embodiment for when the contact angle $\alpha 1$ and the contact angle $\alpha 2$ are zero ($\alpha 1=0$, $\alpha 2=0$), here, only the definitions of the values will be discussed.

As illustrated in FIG. 13, the raceway diameter F1 is a diameter related to the contact section of the input-side planetary roller 353 and the input-side inner rolling surface 354 and is the diameter of the input-side inner rolling surface 354. Similarly, the raceway diameter E1 is the diameter of the input-side outer rolling surface 355.

The raceway diameter F2 is a diameter related to the contact section of the output-side planetary roller 363 and the output-side inner rolling surface 364 and is the diameter of the output-side inner rolling surface 364. Similarly, the raceway diameter E2 is the diameter of the output-side outer rolling surface 365.

Dpw1 is the pitch circle diameter of the input-side planetary roller 353, and Dw1 is the diameter of the input-side planetary roller 353.

Dpw2 is the pitch circle diameter of the output-side planetary roller 363, and Dw2 is the diameter of the output-side planetary roller 363. Here, the pitch circle diameters of the input-side planetary roller 353 and the output-side planetary roller 363 are substantially equal.

According to the above-described configuration, the number of required components can be reduced compared with when components etc., including the input-side inner rolling surface 354 and the output-side inner rolling surface 364, are provided separately.

REFERENCE SIGNS LIST 1, 101, 201, 301 speed increasing/decreasing apparatus
2 input shaft (first rotary shaft)
3 output shaft (second rotary shaft)
4 case
5, 105 input-side angular ball bearing (first rolling bearing)
6, 106 output-side angular ball bearing (second rolling bearing)
7, 107 retaining part
11 outer-ring supporting part (supporting part)
11A transmission surface (transmission part)
12 first support bearing (third rolling bearing)
13 second support bearing (fourth rolling bearing)
24 second support outer ring (fourth outer ring)
31A load-receiving surface (load-receiving part)
32 preload unit
51, 151 input-side inner ring (first inner ring)
52, 152 input-side outer ring (first outer ring)
53 input-side ball (first rolling member)
54, 154, 354 input-side inner rolling surface (first inner rolling surface)
55, 155, 355 input-side outer rolling surface (first outer rolling surface)
61, 161 output-side inner ring (second inner ring)
62, 162 output-side outer ring (second outer ring)
63 output-side ball (second rolling member)
64, 164, 364 output-side inner rolling surface (second inner rolling surface)
65, 165, 365 output-side outer rolling surface (second outer rolling surface)
153 input-side conical roller (first rolling member)
163 output-side conical roller (second rolling member)
307 planetary pin (retaining unit)
353 input-side planetary roller (first rolling member)
363 output-side planetary roller (second rolling member)
L: rotation axis
$\alpha 1$ contact angle (first contact angle)
$\alpha 2$ contact angle (second contact angle)

The invention claimed is:
1. A speed increasing/decreasing apparatus comprising:
a first rotary shaft that is disposed in such a manner as to be rotatable around a rotation axis;
a second rotary shaft that is disposed in such a manner as to be rotatable around the rotation axis and that has a cylindrical supporting part covering an end section of the first rotary shaft;
a case that supports the first rotary shaft and the second rotary shaft;
a first rolling bearing that is disposed between the first rotary shaft and the case and that supports the first rotary shaft in such a manner as to be rotatable;
a second rolling bearing that is disposed between the supporting part and the first rotary shaft and that supports the first rotary shaft and the second rotary shaft in such a manner as to be rotatable relative to each other;
a preload unit that is provided on the case and that applies a preload force such that the second rotary shaft is pushed to the first rotary shaft side;
a transmission part of the second rotary shaft that transmits the preload force applied to the second rotary shaft to the second rolling bearing; and
a load-receiving part of the case that receives the preload force transmitted from the second rolling bearing to the first rolling bearing, wherein
the first rolling bearing includes
- a first inner ring that includes a first inner rolling surface having a surface inclined radially outward at least from the first rotary shaft to the second rotary shaft and that is connected to the second rolling bearing so as to be capable of transmitting the preload force,
- a first outer ring that includes a first outer rolling surface having a surface inclined radially outward at least from the first rotary shaft to the second rotary shaft and that is connected to the load-receiving part so as to be capable of transmitting the preload force, and
- a plurality of first rolling members disposed between the first inner rolling surface and the first outer rolling surface so as to be capable of rolling, and the second rolling bearing includes
- a second outer ring that includes a second outer rolling surface having a surface inclined radially inward at least from the first rotary shaft to the second rotary shaft and that is connected to the transmission part so as to be capable of transmitting the preload force,
- a second inner ring that includes a second inner rolling surface having a surface inclined radially inward at least from the first rotary shaft to the second rotary shaft and that is connected to the first rolling bearing so as to be capable of transmitting the preload force, and
- a plurality of second rolling members disposed between the second inner rolling surface and the second outer rolling surface so as to be capable of rolling, and wherein a rotational speed ratio i of rotational speed n1 of the first rotary shaft and rotational speed n5 of the second rotary shaft is represented by the following expressions using a raceway diameter F1 of the first inner rolling surface, a raceway diameter E1 of the first outer rolling surface, a raceway diameter F2 of the second inner rolling surface, and a raceway diameter E2 of the second outer rolling surface:

$$i = n1/n5$$

$$= E2(F1+E1)/(E2F1-E1F2).$$

2. The speed increasing/decreasing apparatus according to claim 1, wherein the raceway diameter F1 of the first inner rolling surface and the raceway diameter E1 of the first outer rolling surface are controlled by changing a first contact angle of the first rolling bearing.

3. The speed increasing/decreasing apparatus according to claim 1, wherein the raceway diameter F2 of the second inner rolling surface and the raceway diameter E2 of the second outer rolling surface are controlled by changing a second contact angle of the second rolling bearing.

4. A speed increasing/decreasing apparatus comprising
- a first rotary shaft that is disposed in such a manner as to be rotatable around a rotation axis;
- a second rotary shaft that is disposed in such a manner as to be rotatable around the rotation axis and that has a cylindrical supporting part covering an end section of the first rotary shaft;
- a case that supports the first rotary shaft and the second rotary shaft;
- a first rolling bearing that is disposed between the first rotary shaft and the case and that supports the first rotary shaft in such a manner as to be rotatable;
- a second rolling bearing that is disposed between the supporting part and the first rotary shaft and that supports the first rotary shaft and the second rotary shaft in such a manner as to be rotatable relative to each other;
- a preload unit that is provided on the case and that applies a preload force such that the second rotary shaft is pushed to the first rotary shaft side;
- a transmission part of the second rotary shaft that transmits the preload force applied to the second rotary shaft to the second rolling bearing; and
- a load-receiving part of the case that receives the preload force transmitted from the second rolling bearing to the first rolling bearing, wherein a third rolling bearing and a fourth rolling bearing that support the second rotary shaft in a rotatable manner are provided adjacent to each other in the rotation axis direction between the second rotary shaft and the case, and wherein the fourth rolling bearing is a roller bearing having a substantially cylindrical rolling member, the preload unit applies the preload force to the third rolling bearing via a fourth outer ring of the fourth rolling bearing, and the third rolling bearing transmits the preload force to the second rotary shaft.

* * * * *